(12) United States Patent
Ryer

(10) Patent No.: US 6,714,298 B2
(45) Date of Patent: Mar. 30, 2004

(54) SPECTRAL INSTRUMENT USING MULTIPLE NON-INTERFERING OPTICAL BEAM PATHS AND ELEMENTS FOR USE THEREWITH

(76) Inventor: Damond V. Ryer, 5 Bay View La., Newbury, MA (US) 01951

( * ) Notice: Subject to any disclaimer, the term of this patent is extended or adjusted under 35 U.S.C. 154(b) by 230 days.

(21) Appl. No.: 09/728,247

(22) Filed: Nov. 30, 2000

(65) Prior Publication Data

US 2001/0046047 A1 Nov. 29, 2001

Related U.S. Application Data

(60) Provisional application No. 60/168,348, filed on Dec. 1, 1999.

(51) Int. Cl.$^7$ ................ G01J 3/18; G01J 3/28

(52) U.S. Cl. .............. 356/328; 356/333; 356/334

(58) Field of Search ................. 356/305, 326, 356/328, 332, 333, 334

(56) References Cited

U.S. PATENT DOCUMENTS

| | | | | |
|---|---|---|---|---|
| 3,936,191 | A | * 2/1976 | Chupp ............... | 356/333 |
| 4,867,563 | A | * 9/1989 | Wurm et al. ......... | 356/328 |
| 4,888,714 | A | * 12/1989 | Dingle .............. | 702/188 |
| 4,961,646 | A | * 10/1990 | Schrammli et al. .... | 356/328 |
| 5,319,437 | A | * 6/1994 | Van Aken et al. ..... | 356/326 |

FOREIGN PATENT DOCUMENTS

JP 5-149787 * 6/1993

* cited by examiner

*Primary Examiner*—F. L. Evans
(74) *Attorney, Agent, or Firm*—George W. Dishong

(57) ABSTRACT

A spectrometer, or a spectral instrument using multiple non-interfering optical beam paths and special optical elements. The special optical elements for use with the instrument are used for directing the optical beam and/or altering the form of the beam. The instrument has the potential, depending upon the totality of the optical components incorporated into the instrument, to be a monochromator, a spectroradiometer, a spectrophotometer and a spectral source. The spectral instrument may further be a part of the spectral system. The system may include the spectral instrument, a power module and means for remote control of the instrument. Such remote control may be by use of a personal computer or a control system dedicated to the control, measurement and analysis of the collected information. The multiple non-interfering beam paths are created using specially designed optical elements such as a diffraction grating, a splitter box, a zero back-lash drive system for movement of the grating element. The orientation of and a physical/spatial relationship between the field lenses, slits, return mirror, reflecting prism, turning lenses all define the multiple, preferably two paths. Particularly, there is a double pass through the grating to increase dispersion, reduce scatter while maintaining a perfect temperature independent spectral match for the second pass. Using the same grating twice reduces scatter by about a factor of 1000, increases the dispersion by a factor of two, and eliminates any temperature-related mechanical spectral drift which often is present with two separate monochromators. Because of the specially designed grating structure, the grating can cause the concurrent diffraction of a plurality of incident optical beams, each of which beams have different angles of incidence and different angles of reflection. The path of the incident and the reflected beam to and from the grating is "off-axis". That is, the beams going to and from the grating do not use the optical axis of the grating structure.

40 Claims, 18 Drawing Sheets

SPECTRAL INSTRUMENT USING MULTIPLE NON-INTERFERING OPTICAL BEAM PATHS AND ELEMENTS FOR USE THEREWITH

CROSS-REFERENCE TO RELATED APPLICATIONS

This application claims the benefit of Provisional Application Ser. No. 60/168,348 filed on Dec. 1, 1999, entitled SPECTRAL INSTRUMENT CONFIGURABLE AS A SPECTRORADIOMETER, SPECTROPHOTOMETER AND SPECTRAL SOURCE.

STATEMENT REGARDING FEDERALLY SPONSORED RESEARCH OR DEVELOPMENT

Not Applicable.

BACKGROUND OF THE INVENTION

1. Field of the Invention

The instant invention most generally relates to spectrometers and spectral instruments. Particularly this invention relates to the manipulating and the directing of electromagnetic beams, preferably within the optical spectrum. More particularly, using appropriate optical elements, a plurality of non-interfering beams paths are created and each of which beams are controlled, directed as to the paths, and shaped, dispersed, diffracted and otherwise manipulated. The manipulation, directing, redirecting, diffracting, frequency selection and the like, accomplished to each of the beams of the plurality of beams is accomplished by some of the same elements. More particularly, there are two beams, a first or an in beam and a second or an out beam going in substantially opposing directions and passing through the same control, manipulation and direction elements concurrently and without interference. One beam manipulating element is a means for diffraction which diffracts or spatially separates the wavelengths within the spectrum of each of the beams concurrently and without interference with gains in the discrimination of the wavelength from the spectrum. The preferred means for diffraction is a concave spherical shaped grating with a specially configured hyperbolic shaped holographic grating surface designed to diffract and reflect the beam off of the optical axis of the grating structure. Even more particularly, the invention is a spectral instrument which combines the functions of several optical instruments usually used separately in spectrometry measurements. The instrument may have any combination of elements such as means for coupling a beam to be measured into the instrument, a monochromator which monochromator preferably has the dual and non-interfering optical beam paths, means for scanning the optical spectrum, such as a motor and drive mechanism which causes the means for diffracting to move through an arc and consequently discriminate a particular set of wavelengths, means for sorting out harmonics or orders of the monochromatic beam, such as filters, means for chopping or modulating the beam being measured, means for detection of the selected frequency/wavelength and means for amplification of the power level of the detected wavelength. Most particularly, the invention is a spectral system which includes the spectral instrument and which may have at least a power module and one or a combination of such as a means for remotely controlling the scanning, the filtering/sorting functions and the control of the power to the instrument. The instrument may preferably have a housing or casing, within which the optical elements of the instrument are housed, which housing protects the contents from changes in or unwanted characteristics in ambient conditions including spatial orientation, atmosphere and mechanical shock. The operation of the preferred system and the instrument requires no adjustments or manipulations by an operator or user. Scanning, order sorting and the measured output of the instrument are all controllable and available to the user from a PC (Personal Computer). Access to the instrument, using the system may be by remote connection such as by telephone lines via a modem or by any form of dedicated communication with the instrument.

2. Description of Related Art

A spectrometer is an instrument which is used in the analysis of the characteristics of electromagnetic energy over a certain identified spectrum or frequency distribution. The frequencies normally considered to be in the spectrum have wavelengths from as long as 10,000 nanometers (nm) to as short as 100 nm all of which frequencies are within the spectrum of the optical portion of the electromagnetic spectrum. The instrument may be used for any combination of functions such as observing, resolving, recording and amplitude measuring of frequency distribution and the amplitudes or power levels of the various frequencies or wavelengths which make up the spectra of the observed optical spectrum. A spectroradiometer is a spectrometer that is more specifically equipped with scales for measuring the positions of spectral lines of radiation and the level of energy of each of the wavelengths which relate to the spectral lines. A spectrophotometer is used for measuring the intensity of a particular spectrum in comparison to the intensity of light from a standard spectral source to determine the concentration and the composition of the substance that emits or absorbs spectral lines of the spectrum.

Currently, a spectrometer that performs spectrometry, spectroradiometry, and spectrophotometry is a large, immobile device, not amenable to mobile applications. The current practice is to assemble individual components such as input optics, at least one monochromator, filters to eliminate unwanted harmonics or orders, detectors and amplifiers. That is, if one wishes to do a spectroradiometric measurement of a particular optical beam, the individual components are carefully selected and positioned in order to carry out the radiometric measurements. In addition, many of these currently-available devices do not have the resolution nor the precision to accomplish the many tasks for which a spectrometer could be useful. One common problem is inadequate stray light rejection. Stray light rejection, which is express as a "scatter figure", is the ability of the system to measure only light of a specified wavelength and to ignore all other light. Other issues with currently-available spectrometers, which issues are considered to be of disadvantage or inconvenience, include complex operating procedures, frequent recalibration requirements, and the oxidation of the optics. Most spectroscopy systems which are reasonably priced and which are relatively easy to use do not provide for accurate and stable measurements. There are many polychromator systems that are reasonably affordable however, the scatter rejection is inadequate thereby making it difficult to obtain absolute measurements that represent true and accurate readings of the character of the spectrum. Purity (scatter) in the current technology often causes gross errors in the readings. In fact, the scatter figure for some current systems is not good enough for accurate measurements of modest signals from broadband sources. Other inexpensive systems fall short when it comes to high resolution, wide band coverage, small signal amplification, and order sorting.

U.S. Pat. No. 4,867,563 in class 356/328 discloses a silicon photodiode for receiving light: (1) having a bandwidth in the range of between 2 and 15 nm (nanometers) from a pivotable concave holographic diffraction grating within the wavelength range of between 250 and 1150 nm at a scanning rate in the range of 20 to 100 nm per second; (2) having stray light of high intensity and undesired frequencies and the shorter wavelength harmonics of the selected frequency range blocked by filters; and (3) having flux of at least 10 microwatts per square meter of diffuser plate for each nanometer of bandwidth. Automatic electrical zeroing is obtained by blocking all light at the beginning of each scan, obtaining an electrical drift-related signal and using the drift signal to adjust the measured signal during the scan. Several different sensing interfaces can be used, including a quartz, light fiber probe having at least a 50% packing density and a cone angle of at least 24 degrees. The data and the programming storage are at least 30 K bytes but the instrument uses relatively little power when the instrument is not scanning. The purpose of this invention defined in the '563 Patent is to provide sufficient sensitivity, spectral resolution and speed for environmental measurements in the field using a portable spectroradiometer.

U.S. Pat. No. 5,528,364 discloses a monochromator which employs a spherical mirror, a traveling plane mirror with simultaneous rotation, and a varied spacing plane grating. The divergent beam from the entrance slit is converged by the spherical mirror located at the various positions in the monochromator depending of the inventive system. To provide the meaningful diffraction efficiencies and to reduce unwanted higher order lights, the deviation angle subtending the incidence and diffraction beams for the plane grating is varied with the position of the traveling plane mirror with simultaneous rotation located in the front or back of the plane grating with wavelength scanning. The outgoing beam from the monochromator goes through the fixed exit slit and has the same beam direction regardless of the scanning wavelength. The combination of properly designed motions of the plane mirror and novel varied-spacing parameters of the inventive plane grating corrects the aberrations and focuses the monochromatic spectral image on the exit slit, enabling measurements at high spectral resolution.

In the invention defined in the '364 Patent, the centers of the entrance slit, spherical mirror, traveling plane mirror with simultaneous rotation, grating, and exit slit lie in one and the same vertical plane. A spherical mirror accepts the beam from the entrance slit at an angle of incidence è and produces a vertically converging beam incident onto a varied spacing plane grating. Vertically diffracted light of wavelength e is focused on the exit slit and can also be focused horizontally if an optional concave mirror is inserted. Wavelength scanning is carried out by grating rotation about the central groove while the mirror is traveling on the normal to the exit slit and rotating. Therefore the deviation angle of the grating varies with the scanning wavelength. As the role of the plane mirror is merely to transmit the diffracted rays to the exit slit at an angle o, the system is considered as a double-element system consisting of the mirror and the grating. Thus, the design of this monochromator is determined by the ruling parameters of the grating, the total distance the light travels and the deviation angle for given values of the wavelength scanning range.

U.S. Pat. No. 5,394,237 in class 356/328 discloses a lightweight, portable spectroradiometer that provides a real-time data acquisition capability from 0.3 µm to 3.0 µm with selectable integration periods, and operates through a Centronics parallel port of a personal computer to program the spectrometer, store data, and to provide real time graphic output. Equipped with two spectrometers operating from a common optical input, high detector efficiency is obtained by structuring the detector elements for maximum energy gathering capability, matched to slit aperture size and orientation. No filters or mechanically driven mirrors are required, thereby permitting a compact, easily portable instrument. If desired, the detector array is readily adaptable to thermoelectric cooling.

U.S. Pat. No. 5,646,735 in class 356/402 discloses a hand-held instrument for reflection measuring of optical density and color on printed sheets used not only for measuring light reflections but also for transmission of the test data to a computer. The hand-held instrument is provided with an instrument housing having a measuring head and an electronic control unit in the housing for converting the values measured in the measuring plane of the sheet. The housing contains an electronic computer input system connected to the electronic control unit, at least one click knob operable externally on the housing, and a control element for the inputs to the computer input system. A junction box is provided for an interface for transmission of the measured data converted in the electronic control unit into signals to a computer.

The patents noted herein provide considerable information regarding the developments that have taken place in this field of spectrometry. Clearly the instant invention provides many advantages over the prior art inventions noted above. Again, it is noted that none of the prior art meets the objects of the disclosed spectrometer, the special grating structure and the spectral measurement system in a manner like that of the instant invention. None of them is as effective and as efficient as the disclosed spectrometer for high performance, compact size, ease of use, versatility, and high precision.

SUMMARY OF THE INVENTION:

The invention can most generally be characterized as a spectrometer, i.e., as a spectral instrument using multiple non-interfering optical beam paths and special optical elements. The special optical elements for use with the instrument are used for directing the optical beam and/or altering the form of the beam. The instrument has the potential, depending upon the totality of the optical components incorporated into the instrument, to be a monochromator, a spectroradiometer, a spectrophotometer and a spectral source.

The spectral instrument may further be a part of the spectral system of the invention. The system may include the spectral instrument, a power module and means for remote control of the instrument. Such remote control may be by use of a personal computer or a control system dedicated to the control, measurement and analysis of the collected information.

The multiple non-interfering beam paths are created using specially designed optical elements. Without these elements, the instrument could not function in the manner described. The specially designed optical elements or components are such as a diffraction grating, a splitter box used to direct an entrance or incoming beam as well as an exit or return beam, a zero back-lash drive system for causing the movement of the grating element, an orientation of and a physical/spatial relationship between the field lenses, slits, return mirror, reflecting prism, relay or turning lens, all of which define the multiple paths for the traverse of the incoming optical energy. Preferably, there are two defined paths each of which use some of the same beam directing and beam altering components and each of which path is non-interfering with the other beam path. One of the paths may be characterized as an "in path" and the other an "out path".

Particularly, the present invention provides for a double pass through the grating to increase dispersion, reduce scatter while maintaining a perfect temperature-independent spectral match for the second pass. Using the grating twice reduces scatter by about a factor of 1000, increases the dispersion by a factor of two, and eliminates any temperature-related mechanical spectral drift which often is present with two separate monochromators.

One aspect of the invention is a specially designed grating which is moveable through a defined number of degrees—in the preferred embodiment the movement is through about 25 degrees of rotation about an optical axis of the grating component. In part because of the specially designed grating component, the grating can cause the concurrent diffraction of a plurality of incident optical beams, each of which beams have different angles of incidence and different angles of reflection. It is important to note that the path of the incident and the reflected beam to and from the grating is "off-axis". That is, the beams going to and from the grating do not use the optical axis of the grating structure. The grating structure in effect diffracts the incident beam, i.e., spatially separates the incident beam so as to locate the different wavelengths in spatial relationship and reflect this spatial spectrum in a predetermined direction. A portion of the spatial spectrum, i.e., the diffracted beam, impinges on a slit which selects that wavelength which is incident to the slit. The portion of the spatial spectrum impinging on the slit and consequently the frequency/wavelength of the optical signal which is selected, is a function of the moveable position of the grating structure. Use of this grating structure concurrently by more than one non-interfering beam of spectral energy has many advantages over the sequential use of separate monochromators.

Another aspect of the invention is the particular orientation and location of optical elements to direct and define a plurality of paths for an optical beam and alter the optical beams of energy which enter the instrument. The optical elements directing and altering the beam define the paths and are used concurrently and simultaneously and in a non-interfering manner to direct and alter the form of the energy contained in each of the beams and in the beam paths. The optical beam paths in the preferred embodiment, are in directions which are non-interfering and basically opposed each to the other. Energy within the optical spectrum of each of the beam paths is simultaneously acted upon by the same elements.

Yet another aspect of the invention is to provide a means for automatically initializing the instrument using a source of known wavelength and also for verifying the accuracy of the measured characteristics of the incoming optical beam. In the verification and initialization modes, the known wavelength is dispersed by the grating but the energy beam is, this time, "on-axis" that is, it is on the optical axis of the diffraction grating element. A detector or receiver of the known signal dispersed on-axis from the grating surface is measured by the calibrated and known receiver which can then be compared with the dispersed incoming signal. The position of the stepper motor, worm gear drive system which provides the angular movement of the grating is automatically positioned so that the calibration wavelength is caused to be over the first discriminator slit of the instrument.

It is therefore an object of the present invention to provide a spectrometer system, having as a part of the system a spectral instrument wherein the spectral instrument comprises means for detecting optical wavelength energy; means for performing functions upon detected optical energy the functions performed being those of typical and known spectral instruments such as monochromators, spectroradiometers, spectrophotometers and a spectral energy sources. An additional component of the system is at least a power module which provides to the instrument, operating power, means for communicating, means for interconnecting the spectral instrument with a computer or other means for controlling the instrument as to the performance of the functions. The system may also have such features and components as means for receiving commands from a list of commands and means for responding to each of the commands. The commands consist of at least one command selected from the group consisting of power on and off, scan wavelengths including selection of start wavelength and end wavelength, read and display measured data, instrument calibration and validation, and a command to cage a drive mechanism. The drive mechanism causes an arcuate movement of a grating component which movement effectively causes the scanning of the spectrum of the optical energy into the instrument. There may also be provided as a part of the system, software which is operable on a computer used to control and communicate with the system. The software provides means for remotely accessing, controlling functions, controlling performance, and controlling measurement and characterizing of measured data developed by the spectral instrument. Other features incorporateable into the system is programmable electronics and means to indicate malfunction within the instrument such as at least one indicator light.

Another object of the present invention is to provide the spectral instrument with a plurality of optical components. Each optical component is particularly oriented and located each with respect to the others. Some selected optical components function to direct and define a plurality of beam paths for an optical beam and other selected optical components function to alter the nature of the optical beams as to energy dispersing the spectrum and discriminating wavelengths from the spectrum of wavelengths which enter the spectral instrument. Each of the beam paths are used concurrently and simultaneously and in a non-interfering manner by any optical beam traveling over the beam paths.

Yet another object of the present invention is to provide a spectral instrument for performing analysis of spectral energy of an input optical beam in terms of the unique paths taken by the input optical beam which paths are defined by a plurality of optical components. The input optical beam may have a particular wavelength distribution and energy distribution. The basic form of the spectral instrument comprises; a first monochromator portion comprising a first entrance slit. This first entrance slit is in optical beam path relationship with a grating component. There is also a first exit slit which is in diffracted and wavelength selected beam path relationship with a first reflective surface of the grating component. And there is a second monochromator portion comprising a second entrance slit. The second entrance slit is in a mirror image optical beam path relationship with a return mirror and with the grating component. A second (2) exit slit is in twice diffracted and twice wavelength selected beam path relationship with a second reflective surface of the grating component. The optical beam paths of the first monochromator portion and the second monochromator portion are so configured and designed so that each path, that is the path taken by an optical beam through the first monochromator portion is substantially non-interfering with the path taken by the optical beam through the second monochromator portion.

A still yet another object of the invention is to provide additional features to the instrument all directed toward enhancing the performance and to increase the functions the instrument can perform. For example there may be a means for chopping at a predetermined chop rate, any optical beam within both monochromator portions. The means for chopping is preferably positioned in optical beam path relationship with the first exit slit and a return mirror and the return mirror and the second entrance slit. So the spectral instrument may scan the spectrum, there is provided a drive mechanism which provides the means for moving the grating component thereby selecting the wavelength discriminated by both the first monochromator and the second monochromator.

A further object of the present invention is to provide a spectral instrument for performing analysis of spectral energy of an input optical beam in terms of a plurality of optical components and the functions performed and positional relationships of the components. The spectral instrument comprises; a first entrance slit upon which an entrance optical beam, derived from the input optical beam, is directed in a first path (1). The first entrance slit creates an entrance slit beam which has a cross section dimensions substantially equal to the cross section dimensions of the first entrance slit. There is a first location on a prism first reflecting surface upon which the first entrance slit beam is directed in a second path (2). The prism first reflecting surface directs the first entrance slit beam on a third path (3) to a grating component. The first entrance slit beam is thereby diffracted by the grating component creating a first diffracted beam which first diffracted beam is reflected in a fourth path (4) from the grating component surface to a first location on a prism second reflecting surface. A field lens upon which the first diffracted beam is directed on a fifth path (5) from the prism second reflecting surface focuses and directs the first diffracted beam and a defined and selected portion of the optical spectrum of the first diffracted beam onto a first exit slit. The first exit slit thereby discriminates and produces a narrow bandwidth beam of optical wavelengths. A return mirror, upon which the narrow bandwidth beam is directed on a sixth (6) path, creates a mirror image beam of the narrow bandwidth beam and directs this beam on a seventh path (7) back to the field lens. A second entrance slit, upon which the mirror image beam is directed on an eighth path (8) by the field lens, provides further discrimination of the mirror image beam. A second location of the prism second reflecting surface is where the discriminated mirror image beam is directed. From this second location the discriminated mirror image beam is directed on a ninth path (9) to the grating component. This mirror image beam is again diffracted or dispersed by the grating component creating a diffracted discriminated mirror image beam which is reflected on a tenth (10) path from the grating component surface to a second location on the prism first reflecting surface. There is a second exit slit upon which the second location on the prism first reflecting surface directs the diffracted discriminated mirror image beam providing a second discrimination of the diffracted mirror image beam.

A yet further object of the invention is to provide additional features to the instrument all directed toward enhancing the performance and to increase the functions the instrument can perform. For example there may be a means for chopping at a predetermined chop rate, any optical beam within the spectral instrument. The means for chopping is preferably positioned in the path of the first diffracted beam and the mirror image beam. So the spectral instrument may scan the spectrum, there is provided a drive mechanism which provides the means for moving the grating component thereby selecting the wavelength thereby selecting the wavelength discriminated by both said first exit slit and said second exit. A turning mirror directs therefrom, the diffracted discriminated mirror image beam into an instrument output portion wherein may be located an order sorting filter followed in the path by a detector and perhaps a detector amplifier preferably a lock-in or phase locked amplifier. There may also be input optics, which input optics is selected from such as a wide angle lens, a narrow angle lens and fiber optics. And there may be means for optical initialization and a means for verification of wavelength using, on-axis, the grating component and a known wavelength source.

The drive system or drive mechanism is a specially designed anti-backlash system using a stepper motor coupled to a slip-coupled magnetic system and then to a flexible shaft having a worm gear engaging a sector drive component which in turn cause movement of the grating assembly. The worm gear and the gears on the sector drive are configured to substantially eliminate any back-lash at the gear engaging location.

These and further objects of the present invention will become apparent to those skilled in the art to which this invention pertains and after a study of the present disclosure of the invention.

DETAILED DESCRIPTION OF THE INVENTION

Figure 1:
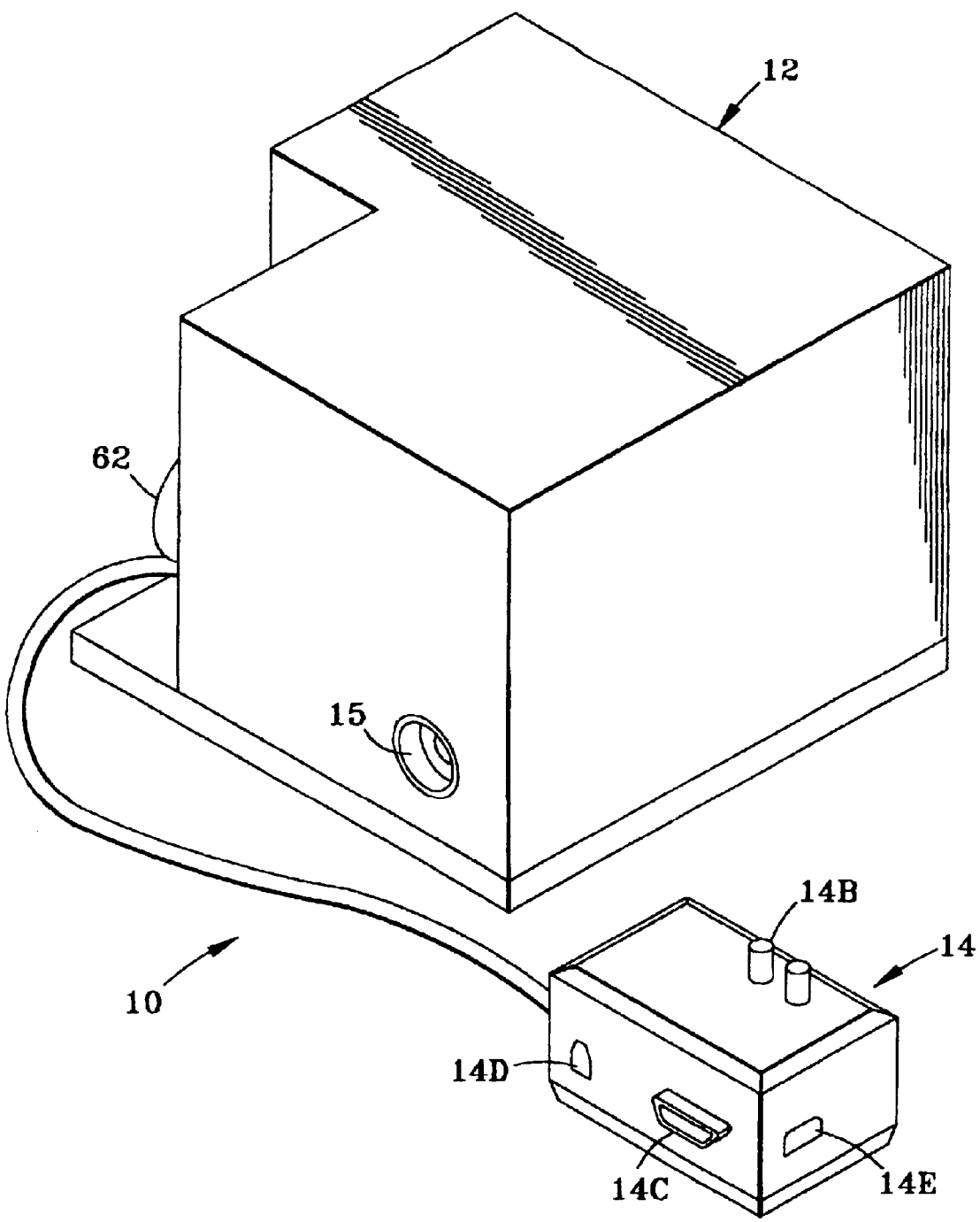
FIG. 1 is a pictorial sketch of the system of the invention.
Figure 2:
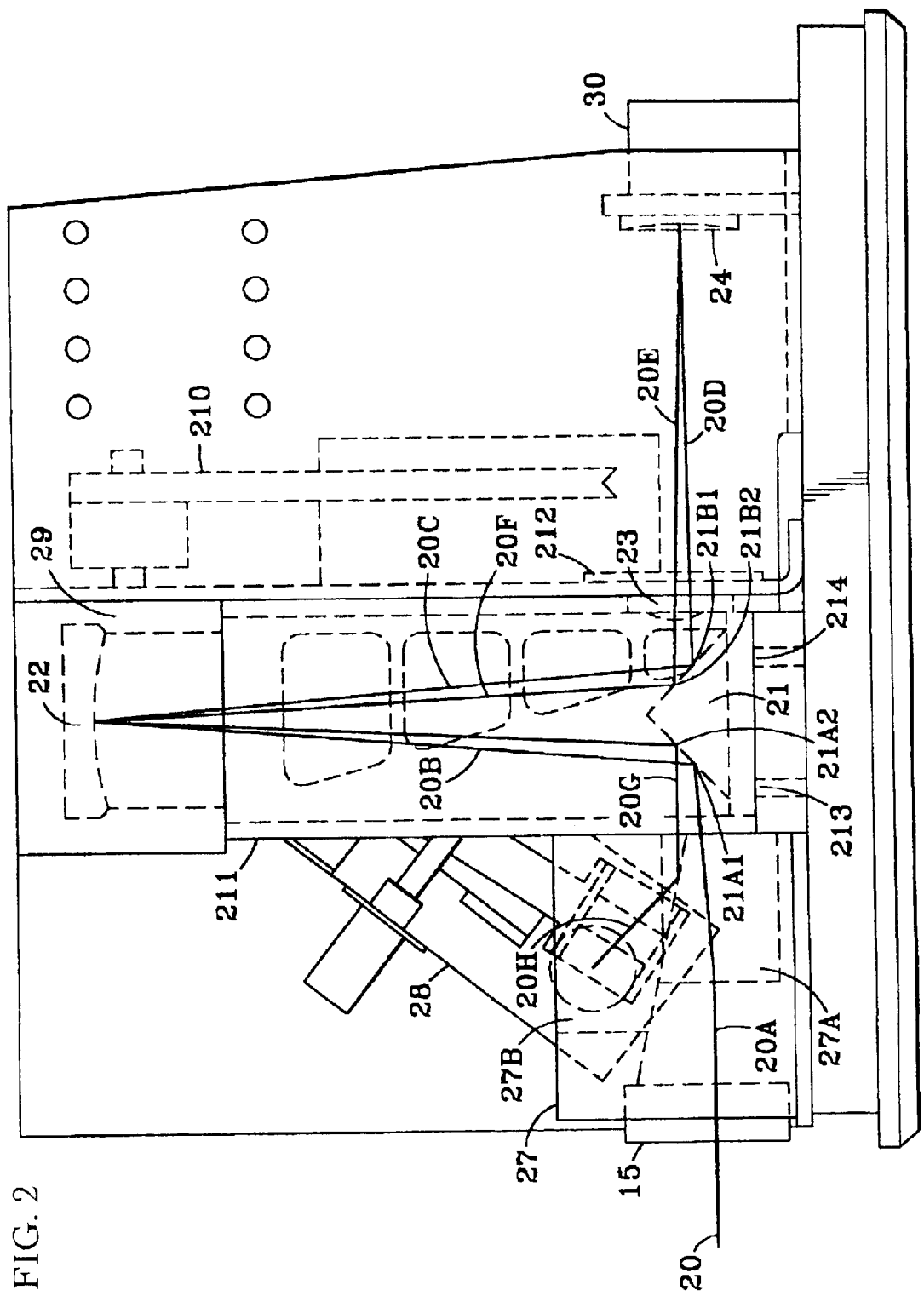
FIG. 2 is a right side plan view with interior components shown in shadow and illustrating the optical path.

The following is a description of the preferred embodiment of the invention. It is clear that there may be variations in the size and the shape of the disclosed spectrometer. The system may include variations of power modules and control devices.

As was previously noted, a spectrometer is an instrument which is used in the analysis of the characteristics of electromagnetic energy over a certain identified spectrum or frequency distribution. The frequencies normally considered to be in the optical spectrum have wavelengths from as long as 10,000 nanometers (nm) to as short as 100 nm all of which frequencies/wavelengths are within the spectrum of the optical portion of the electromagnetic spectrum.

Within the discussion of this invention, the use of the terms optical signal, optical beam, and beam, all refer to electromagnetic radiation or energy having frequencies within the optical range. However, the fundamental aspects of the invention, such as the use of the same energy directing components/elements, the same dispersion component/elements, the same beam shaping and energy altering components/elements to concurrently and substantially simultaneously act upon or effect each path of a plurality of energy paths, may be applicable to spectrums of electromagnetic energy different from the spectrum known as the optical spectrum. The term, path, as used herein, generally means the direction of travel of the beam of radiation. At the frequencies within the optical spectrum, paths may be accurately defined and created using devices such as mirrors, lenses, prisms, diffusers, diffractors and the like.

The Spectral System

Following is a disclosure of the many advantages, features, and uses for the system of the invention. This information is provided to better describe the preferred embodiment of the system including substantial detail regarding some of the enhancing features of the system.

1) Ease of use: The disclosed spectrometer's provision for different configurations in the form of separate systems provides a "turn key" system, for the user. No specialized knowledge is required to operate the system since it has very simple software to control the system even if photonics is unfamiliar to the user. Also, in the preferred embodiment, the disclosed spectrometer is fully automatic, i.e. there are no manual controls on the instrument, not even an on/off switch. When a file is opened to the appropriate communications port, or alternatively, if the system is accessed using the phone, the instrument turns itself on. The system can also automatically "cage" the grating drive system so that it can take more that 50 g's of shock, and automatically "uncages" itself when it is telephoned or when a file is opened to the connected communications port. Through software and communication systems, the wavelength step size per reading can be set. Two motors and two solenoids control all the functions by computer selections, thus the instrument cannot go out of range or crash the drive motor. Error protection is designed into the system: if the instrument is instructed to do something that is not advisable or possible, an error message in plain English is displayed to the user. This error protection feature is designed to help the user obtain the results without error.

2) Versatility: The disclosed spectrometer can be operated using permanent alternating power available from any country, or from mobile power derived from an automobile battery directly or through the use of the cigarette lighter socket. The spectrometer can be controlled by either a local or remote computer, which, in the preferred embodiment, is connected via a telephone line and modem.

3) Output: The disclosed spectrometer passes the data through either of the two communication ports. When data are requested through either the SCAN or READ instruction, the system sends a data stream in either a brief or verbose mode for each data point. In the verbose mode, the system sends the scientific notation data point, plus the units and the wavelength. In the brief mode, the system drops the units and wavelength since the host computer software usually keeps track of those details. In a typical scan, the spectrometer sends an annotated data stream every 500 milliseconds at one of the baud rates selected by the host computer or modem. The available speeds are 600, 1200, 2400 and 9600 bits per second for the direct computer hookup or any of the lower three selections for the telephone hookup.

4) Remote Control: Light measurement must be performed in a dark room or special area where ambient light can be controlled. The computer that controls the spectrometer must be located in an illuminated area in order to operate the keyboard. Often the spectral system is shared among users operating different computers within a building. The disclosed spectrometer can be operated through a telephone line, which line can be called by any of the users. For the disclosed invention, this call-in feature is standard and easy to configure.

5) Power: The power module requires, when providing maximum power, less than 24 watts and accepts as the input, power having the following characteristics of voltage, current and frequency:

100–240 volts a.c. (300-125 ma respectively; 47–63 hertz)

10.7–15 v.d.c. at less than 2 amps (typical automotive power)

The system is configured with a SLEEP mode during which the power module and modem remain powered but in a standby mode in order to be ready to awaken the system when necessary. In SLEEP mode, the system uses less than 2 watts; the spectrometer is effectively off.

The range of acceptable voltages for the power module allows the spectrometer to be operated in any country in the world. It can also be operated remotely from a vehicle or motorcycle battery.

6) Control: Control of the disclosed spectrometer occurs through either of two serial communication ports; there are no switches, push-buttons, or knobs, but there are two LED's mounted on the system to enable trouble shooting. One of the two serial communication input/output (I/O) ports is an RS232-compatible interface (standard 9-pin $D_{min}$ connector) for communications between the system and a personal computer communications port. A 25-pin $D_{min}$ connector can be accommodated by using a standard adapter. The other of the two serial communication ports is for remote control by telephone. An internal modem is accessed through a standard RJ11 telephone jack. When a computer program opens a file to the communications port, the spectrometer becomes operational automatically. Likewise, if the modem receives a call, the system becomes operational.

During operations, the disclosed spectrometer receives all commands through either of the above-described ports. Commands to the spectrometer are in the form of human-readable instructions such as BEGIN 500<cr>, END 600<cr>, STEP 5<cr>, SCAN<cr>. This sequence will scan between 500 and 600 nm and will report the data in 5 nm steps. In the preferred embodiment, the instructions are abbreviated for use by controlling software (that operates on the PC performing commands through a communications port) such as LABVIEW™ brand of control software.

7) Thermometer: The system may also include a computer-controlled thermometer which can be read through a user-initiated command. The command instructs the system to return a reading of the inside temperature of the optical system to the nearest 0.5° C.

COMMAND LIST:

| COMMAND | ER # | DESCRIPTION |
|---|---|---|
| 1. BEgin NNNN* | 11 | Enter BEginning wavelength - response "*OK*" |
| BEgin* | | Report beginning wavelength position response"*NNNN*OK*"] |
| 2. STep NN* | 12 | STep increment of 1,2,5,10 and 20 nanometers - response "*OK*" |
| STep* | | Ask for the current step [responds with "*NN*OK*"] |
| 3. ENd NNNN* | 11 | Enter ENd wavelength - response "*OK*"] |
| ENd* | | Report ending wavelength position response "*NNNN*OK*"] |
| 4. SCan* | 13 | Start SCanning process. A SCan given at any time will rewind and start scanning from last known parameters, even if uncal.condition. Brief response:First out="*", then "+N.NNNE*NN*" @ each wavelength. End response:"OK*" |
| 5. SXtend* | | ScanXtend causes a 5 second integration per data point to reduce noise from low level signals. Output same as SCan. It will go back to the default (0.5 sec.) mode when done. |
| 6. REad* | | REad one (1) reading |
| REad 0* | | REad continuous data at each .5 second; (control) R to stop. |
| REad NN* | | Send NN number of readings (1–99) where a number greater than 99 would produce ER 11. See DELAY for time delayed readings. Response: 1st out="*", then "XXXX NM +N.NNNE+NN A*OK*" for each |
| 7. RXtend* | | ReadXtend causes the readings to integrate for 5 seconds to reduce noise. Same format as REad above. |
| 8. UP NN* | 11 | Move UP NN nanometers to a higher wavelength, even if uncal.condition and reports "*OK*". |
| UP* | | Assumes 1 nm UP and reports "*OK*" |
| 9. DOwn NN* | 11 | Move DOwn NN nanometers to a lower(DOwn) wavelength, even if uncal.condition and reports "*OK*". |
| DOwn* | | Assumes 1 nm DOwn and reports "*OK*" |
| 10. DIsplay* | | Ask for a DIsplay of the current status information listing. See example. |
| 11. AUto N* | | AUto 1 = turn on AUto-range [rspns"*OK*"], AUto 0 = turn off AUto-range [rspns"**FREEZING* XXXXNM X.XXXe-XX A*". The exponent can go higher than the FREEZE but not lower. |
| AUto* | | Ask for present AUto mode. Responds with "*AUTO RANGE*" or "*PEAK FREEZE*" |
| 12. (control)R | | Stop any function in progress, cancel all commands in the buffer, & resync system. Response"*WAIT*READY*" |
| 13. VErbose* | | Changes to VErbose mode of reporting the data, as VALUE, UNITS, WAVELENGTH, UNITS: ie:0245NM 7.654e-06 W/CM2/NM(*). Response"*OK*" |
| 14. BRief* | | Changes to BRief mode of reporting the data with irradiance only. Example: 7.654e*06*. Response"*OK*" |
| 15. NM NNNN* | | Slew to designated wavelength(NM) (Use BLaze for optical zero). This command corrects an uncal. condition. response="*OK*" |
| NM* | | Ask for present wavelength(NM) position (if uncal. reestablish next higher wavelength). Response = "*NNNN*OK*" |
| 16. ECho N* | | When N = 1, ECho byte back to user. 0 ECho off. Response="*OK*" |
| EC* | | Reports ECho status:"*N*OK*" where N is 0 or 1. |
| 17. BLaze* | | Slew to optical zero BLaze (bright for phasing). Response="*OK*" |
| 18. PHase* | 02 | Rephase on last SYnc choice (0 = INT, or 1 = ext) Response: Approx.30 lines of progress reporting with "*OK*" at end. Move to BLaze or a strong signal when phasing. |

-continued

| COMMAND | ER # | DESCRIPTION |
|---|---|---|
| 19. TEmp* | 18 | Read the TEmperature to the nearest 0.5 ^° C.(0–40). |
|  | 19 | Response "*NN.N degree C.*OK*" |
| 20. SHip N* |  | "Cage Grating" for shipping:If N=0 or 2; "caging" is turned off or on (respectively) & saves this setting for the future power down. If N=1; then "cage" the grating & shut off this time only. Report SHip* SHip status:"Auto" or "off" (AUTO = CAGE on power off) and "*OK*" |

| THE FOLLOWING ARE COMMANDS FOR FLASH, D.C. AND SPECIAL APPLICATIONS | | |
|---|---|---|
| 21. BIas N* |  | Change state of the detector bias (−5 volts). If "N" = 0, the BIas will be turned off; If "N" = 1 the BIas is turned on. |
| BIas* |  | Ask for the BIas condition. Response *00* (off) or *01* (on). |
| 22. CAlibration N* | 11 | Select the CAlibration file where N=0; Read current in NNNN+NN format, units of amperes. N=1 or 2; Read data with calibrated factor files. Files 3–6 are extra optional files. Responseu"*OK*" |
| CAlibration* |  | Responds with present selected table; ie: "*NN*OK*" |
| 23. OPen* |  | OPen shutter & leave it stopped in the D.C. mode. Rspns="*OK*" |
| 24. CLose* |  | CLose shutter & leave it stopped in D.C. mode. Rspns="*OK*" |
| 25. CHop* |  | Restart CHopper synchronized to SYnc choice. Rspns="*OK*" |
| 26. DElay NNNN* |  | DElay the interval between readings (1–9999 seconds) where 0 is 0.5 second interval. Rspns="*OK*". |
| DElay* |  | Ask for the DElay interval (0–9999). Rspns="*NNNN*OK*". |
| 27. PErcent N* | 45 | 0 = turn % off, 1 = PErcent on & set to 100, 2 = return to last PErcent set point. Rspns="*OK*". |
| PErcent* |  | Report = "*XX*OK*" [0 = off, 1 = new on, 2 = back to last %] |
| 28. SEtup* |  | SEtup for a new cold start initialization. Immediate Rspns="*WAIT*". Completed response="READY*" |

-continued

| THE FOLLOWING ARE COMMANDS FOR FLASH, D.C. AND SPECIAL APPLICATIONS | | |
|---|---|---|
| 29. ZEro* |  | Read ZEro (either chopped or DC) & subtract from future readings. Immediate Rspns="*ZEROING*. Completed response= "XXXX NM +N.NNNE-NN*OK*" |
| 30. VAlidate* | 17 | VAlidates the Wavelength calibration to an internal standard & reports the deviation. Rspns="*+X.XX NM OFFSET*OK*" |
| 31. FLoor N* |  | FLoor where N = 0 to 5. (Display exponent = −11 + FL − SF) Response="*OK*" |
| FLoor* |  | Read the FLoor number from 0 to 5. Respns="*NN*OK*" |
| 32. SYnc N* |  | SYnc on 0 = internal, 1 = External (Look for edge using default) Respns="*OK*" |
| SYnc* |  | Report SYnc status where 0 = internal, 1 = external; ie: "*NN*OK*" |
| 33. FIlter N* |  | Manual FIlter control; 0 = UV filter, 1 = Visible filter (400–619 nm), 2 = IR filter (620–1100). 3 = auto filter insertion. Rspns="*OK*" |
| FIlter* |  | Report filter status; the format is "*XN*OK*" where X is "A"(Auto) or "M"(Manual) and N is "0", "1", or "2" for filter types UV, Vis, & IR. |

| THE FOLLOWING ARE COMMANDS USED FOR INITIAL CALIBRATION. | | |
|---|---|---|
| 34. FActor* |  | 22 Ask for the current sensitivity FActor at the present wavelength in a 9 character transmission as follows: *NNNN+NN*. |
| FActor NNNN+NN* |  | Insert a new FActor at the present wavelength. Response:"*OK*" |
| 35. HOme* |  | Slew to HOme position at the grating zero reference. Rspns="*OK**" when it arrives at home position. |
| 36. MU* |  | Move Up the sector position(NNNN) by one count. Rspns="*NNNN*OK*" |
| 37. MD* |  | Move the sector position(NNNN) one count Down. Rspns="*NNNN*OK*" |
| 38. TO NNNN* |  | Slew the sector TO the designated count(NNNN). Rspns="*OK*" |
| TO* |  | Ask for the current sector position. Rspns="*NNNN*OK*" |
| 39. MOnitor* |  | Switch on the programming MOnitor. Rspns="*XXXX,0*." where the XXXX is the address for the monitor & is the cursor. X* is the monitor instruction to return to command mode, including a new setup. |

-continued

| THE FOLLOWING ARE COMMANDS USED FOR INITIAL CALIBRATION. | |
|---|---|
| 40. HT N* | Higain/Temp Control; N=0 for grat.LED & Temp Osc.off, Higain on; N=1 for grat.LED & Temp Osc.on, Higain off; N=2 for grat.LED and Higain on, Osc.off. Responds with "*OK*" |
| HT* | Do nothing; Responds "*OK*" |
| 41. SN* | SeNse 8 bits (0–7) respectively: /filter1,/filter2, grat.sens, gain,/grat.LED, choplite, sec.sens, sec.LED; Rspns="*NN*OK*" |

CODE FOR THE LIGHTS on the Spectral Instrument:

| | |
|---|---|
| Yellow (steady on) | Power on & host(DTR) or Carrier(CD) is present. |
| Yellow (blink) | Blinks for each RS232 data transfer in either direction. |
| Red | Error condition - If the main loop code gets corrupted the RED light will turn on and a FATAL ERROR message will be sent. The system will shut down as soon as the carrier is lost. |

SYSTEM RESPONSES:

| | |
|---|---|
| READY | Given after power on and initialization are complete. |
| OK | After accepting any command that is in the correct syntax and doesn't have a required response. |
| ER nn | System error that may be caused by RF interference or other computer glitch, or a user bogus command. This will be followed with a verbose suffix if in the VERBOSE mode or cursor in Monitor mode. |

*= carriage return ($0D).
Only the first two (2) characters need to be typed for a command (remaining alpha characters will be ignored)

DISPLAY EXAMPLE

| Display | | Alternate Data |
|---|---|---|
| Wavelength | 0546 | |
| Scan Begin | 0254 | |
| Scan End | 0800 | |
| ScanStep | 02 | (01, 05, 10, 20) |
| Filt. Mode | Auto | (Manual) |
| Filt. Status | UV | (Vis, IR) |
| Chop Status | Chopping | (Open, Closed) |
| Range Status | Auto Range | (Peak Freeze) |
| Floor Adj | 00 | (00–05) |
| Read Status | Signal | (Integrate) |
| Data Display | Verbose | (Brief) |
| Cal. Table | Amps Mode | (01–06) |
| Sync. Status | Internal | (External) |
| Echo Status | Off | (On) |
| Ship Status | Auto | (Off) |

SYSTEM ERROR MESSAGES

| | |
|---|---|
| ?00 | no edge sense |
| ?01 | fatal error shutdown |
| ?02 | PHASING FAILED |
| ?03 | Power Not OK error |

-continued

SYSTEM ERROR MESSAGES

| | |
|---|---|
| ?04 | timeout shutdown |
| ?05 | command not available |
| ?06 | checksum error |
| ?07 | fram check error |
| ?11 | OUT OF RANGE ERROR |
| ?12 | STEP ERROR - choose 1, 2, 5, 10 or 20 |
| ?13 | STEP/END MISMATCH |
| ?14 | SENSOR FAILURE |
| ?16 | Calibration out Reinitialize or send for Calibration |
| ?17 | EEPROM WRITE ERROR |
| ?18 | INTERNAL TEMPERATURE BELOW 0 DEG C. |
| ?19 | INTERNAL TEMPERATURE ABOVE 40 DEG C. |
| ?20 | SPECTRAL ERROR, REINITIALIZE |
| ?22 | COMMAND FORMAT ERROR |
| ?25 | OVERFLOW ERROR |
| ?33 | COMMAND LINE TOO LONG |
| ?35 | Illegal Character |
| ?44 | UNRECOGNIZED COMMAND ERROR |
| ?50 | UARTERROR possible error from CD, DTR or framing error |
| ?51 | U05ERROR irq error from VIA which is not used by program |
| ?52 | U06ERROR irq error from VIA #2 which is not used by the program |
| ?53 | CIA1ERROR irq error caused by C128 CIA#1 |
| ?54 | CIA2ERROR irq error caused by C128 CIA#2 |
| ?55 | ?ERROR irq error undetermined source |
| ?45 | % OUT OF RANGE |
| ?88 | OVER-RANGE |
| ?99 | COMMAND ABORTED BUFFERS CLEARED |

Referring to FIG. 1, system 10 comprises spectral instrument/spectrometer 12 attached by cable to power and interface model 14 which houses 12 volt dc input power connection 14B, RS232 serial communications port 14C, RJ11 telephone connector 14D, and 100–260 VAC input power connector. System 10 may also include software for use with a computer for the remote control of the spectral instrument 12. The control device, i.e., either a special purpose computer with most of the functions being hard-wired or incorporated into programmable chips (e-proms) or a general purpose computer capable of loading and processing the software, is not shown. The specifications of either control device is well known and by itself is not considered within the scope of the present spectrometer system.

The Spectral Instrument

Following is a disclosure of the many advantages, features, and uses of the spectral instrument of the invention. This information is provided to better describe the preferred embodiment of the instrument including substantial detail regarding some of the enhancing features of the instrument.

1) High performance: The instant invention comprises a spectral instrument that can accurately detect and measure a broad spectral range when positioned in any orientation or configuration. The instrument configuration and detector type can be adapted to perform many different applications such as those performed by a monochromator, spectroradiometer, spectrophotometer, and a spectral source. The input optics, which may be selected from wide angle lenses (wide-eyed lens), narrow angle lenses (narrow-eyed lens) or fiber optics, allow for many different applications in each of the above categories, i.e., as a monochromator, a spectroradiometer, a spectrophotometer and a spectral source. For example, acting as a spectroradiometer, the spectral instrument/spectrometer may be required to make spectral flux, spectral irradiance, or spectral radiance measurements. Acting as a spectrophotometer, the instrument may be required to have a short path length for filter measurements or to measure the spectral absorption across an industrial smoke stack where the sample compartment is perhaps four meters wide.

2) High precision: The disclosed spectrometer is capable of auto ranging by more than ten decades' change in light level while "seeing" precise wavelength resolution from the ultra-violet (UV) through to the infrared (IR). High resolution output, however, is often not desirable, especially if the end user of the light is a human. Since the visible spectrum comprises 300 nanometers (700 nm–400 nm=300 nm), the thirteen colors of the visible spectrum then each comprise twenty-three 23 nm per perceived hue. For this reason, it is often desirable to read a very spectrally-irregular light source using a 20 nm bandwidth. The plotted result will be close to that of the "weighting" analysis the human brain automatically performs to create hue perception. For more flexibility, the instrument includes a total spread of "step" options of 1, 2, 5, 10 and the mentioned 20 nm bandwidth. When the user chooses a step band, a mode will be selected to read the average in that chosen step band. The device does not skip over a portion of the band to get to the next step, but rather integrates while the grating is moved in order to obtain an average over the entire interval. The average read is centered around the mid-point of the step, exactly as if the slits had been opened up as would be done on most monochromators.

3) Spectral: The disclosed spectrometer uses a new double pass technology which doubles the resolution and greatly improves the scatter rejection. The system has a dispersion of 4 nm/mm. With 0.5 mm slits, this yields an effective bandwidth of 2 nm. The UV enhanced holographic grating, combined with the high gain silicon detector, provides a bandwidth from 250 to 1100 nm. Such a broad bandwidth requires a novel optical system to reject out-of-band radiation while maintaining a narrow bandwidth and good signal to noise ratio. The 2 nm half power bandwidth allows for detection of detail down to 1 nm such as that found when spectral lines are combined with a continuous spectral output.

4) Purity (scatter): Scatter, which is the gain of the system from unwanted out-of-band signal, can be explained with an example as follows. The wavelength of interest from the color violet illuminated by a typical tungsten source is 420 nm where the absolute spectral irradiance is 10% of the peak which occurs at 1050 nm. A silicon detector peaks at 800 nm and has a relative response of 35% at 420 nm as compared to its peak. Both the source and the detector maximize their sensitivity in the infrared (IR) while they both have reduced sensitivity at the color violet. The combined response to violet is 0.35 times 0.1 or 0.035 where the combined response in the IR is about 0.81 ($0.9^2$). The average lamp/detector response over the entire band of the lamp and detector is about 0.41. The bandwidth of the system is 2 nm while the scatter bandwidth is 350 nm (550–900 nm). The out-of-band component would be the average responsivity (0.41) multiplied by the bandwidth (350) or 143.5 relative. The in-band response is 2×0.035 or 0.07 relative. In order to have a signal that is 100 times larger than the out-of-band scatter, one must have a scatter figure of (0.07/143.5)/100 which is equal to 1/205,000. Most polychromators would fail this test badly. In fact, a very good one has a scatter figure of 1/3000. This would give an absolute error of 68% when reading the tungsten lamp at 420 nm. The present invention has a scatter figure of 1/1,000,000. In the above scenario, the error due to scatter would be 0.2%. It should be noted that it does not matter how bright the source, the scatter goes up and down in direct proportion to the amplitude.

5) Slits: In the disclosed device, virtual slits are created by moving the grating while integrating over a chosen step interval. The effect is the same as having a wider slit. The advantage is that there are fewer moving parts and greater repeatability when returning to a previous selection. In addition, there is benefit by increasing the speed of a scan by using a wider step size. In other words, a step is always read in 500 milliseconds regardless of the selected size of the step. Also, none of the spectrum is missed in the process since all of the spectrum is covered but movement is faster for each step interval. This is very convenient to get a fast low resolution scan of a broad spectral range. Later it may be desirable to magnify a portion that has interesting structure. The actual slits are 0.5 mm wide and the dispersion is 4 nm per millimeter. The virtual slit control offers a selection of 2, 5, 10 and 20. One (1) is also a choice, with the bandwidth remaining at 2, but it moves only one nanometer per step. This will show structure as small as one nanometer wide.

6) Order sorting: A diffraction grating will disperse light at various angles in proportion to the sine of the angle hitting the grating. Light is dispersed in this way in all directions at half the wavelength on the same optical angle. In other words incident white light will be dispersed through diffraction grating to light of 1000, 500, and 250 nm wavelengths that will all travel along the same reflection angle. The wavelengths must be "sorted" to find out how much of the light is attributed to which "order" wavelength. The instant invention has an automatic and programmable feature to insert one of three different filters as it is reading across the spectrum. These filters only let the selected order through, and reject the other unwanted orders. Although filter control is possibly programmable, the automatic setting is recommended.

7) Lock-in Amplifier and Chopper: When dealing with continuous wave (cw) light, light that does not have an alternating component, noise isn't usually a factor and an amplifier can be operated in a direct current (dc) mode. For most thermal detectors and solid state detectors, however, noise increases with the transition to a dc condition, referred to as "one over 'F' noise" (1/f). It is clear that as the frequency approaches zero, the noise increases rapidly. In the instant invention, a special high gain solid state detector amplifier combination is used and dc is not included as one of the frequency components being measured. For amplification of cw light the following process is followed: (1) light is put through the grating as dc on the first pass, (2) the light is then "chopped", (3) the light is then sent back through the grating for a second pass, (4) then, in order to sort out the first pass from the second pass, the alternating component is measured, and (5) very low level radiation is measured which requires the amplification of photo currents below 25 femto amps. At these low currents, the detector's junction capacitance prohibits high speed detection of alternating light. Instead, the invention uses a speed that works over a range of ten billion to one per second. This speed was chosen to be an exact multiple of the power line frequency so that variations in the lamp amplitude due to the power fluctuations would not be seen. In other words the device will "lock in" to the chopper frequency both in phase and in frequency and measure only the "chopped" component of optical radiation. At the same time, the invention measures the consistent number of lamp power cycles for both 50 and 60 cycle world power conditions.

8) Detectors: The invention can be fitted with at least two different detectors. For most applications the detector of choice covers the broadest range (250 nm–1100 nm) and is blind to visible light which makes it an excellent choice for extracting weak ultra-violet (UV) data that is buried in an abundance of long wave radiation.

9) Performance: In the instant invention, performance is optimized around absolute stable precision combined with ease of use and affordability. The system is small, rugged, and portable so it can go to the application rather than having the application come to it. The spectrometer can be operated in any position, and is water tight to inhibit moisture build-up, and thus eliminate dirt and corrosion inside the instrument.

10) Physical: The spectrometer/instrument is configured substantially as a cube that is approximately 225 mm (8.9 in.) on three sides. The input optics are designed to be close to a corner (53 & 50 mm) so the "cube" can be placed in tight locations near the light source. The instrument can be operated in any orientation; it can be positioned such that its optical axis goes from right to left or vice versa. The instrument itself weighs less than 7.8 kg (17 lbs.) with a power communication module that weighs about 800 gms (1.75 lbs).

11) Environmental: The disclosed spectrometer performs under adverse atmospheric conditions. The system comprises a sealed case that reduces the tarnish and corrosion of the aluminum coated optics. The case is designed to withstand full immersion in water to a depth of 1 meter, which equates to tolerance of +10, 6 kPa (kilo Pascals or Kilo Newtons/$m^2$) gauge pressure or negative gauge pressure of −5.0 kPa for high altitude applications. The disclosed electronics can withstand a temperature range of 0–40° C.

12) Calibration: Three different types of calibration are performed on the disclosed spectrometer: current amplification, spectral accuracy, and optical correction. Current amplification can occur over the entire operating range of 1e-11 amps up to 2e-3 amps. The adjustment procedure for current amplification comprises a NIST traceable current calibrator. Spectral accuracy is automatically calibrated by putting the instrument in front of a special mercury spectrum standard source and locating the step position for six spectral lines out of the 7000 steps in the range of the stepper motor. The check points, 0.0, 253.0, 7.0, 435.8, 546.1, 871.6 and 1014 nm, are matched to an accuracy within +/−0.2 nanometers. Optical correction is accomplished by a look up table which is stored in programmable ROM. The instrument is placed at a distance of one meter from the filament to the reference plane using a calibrated SRD to create its own correction file.

Figure 19:
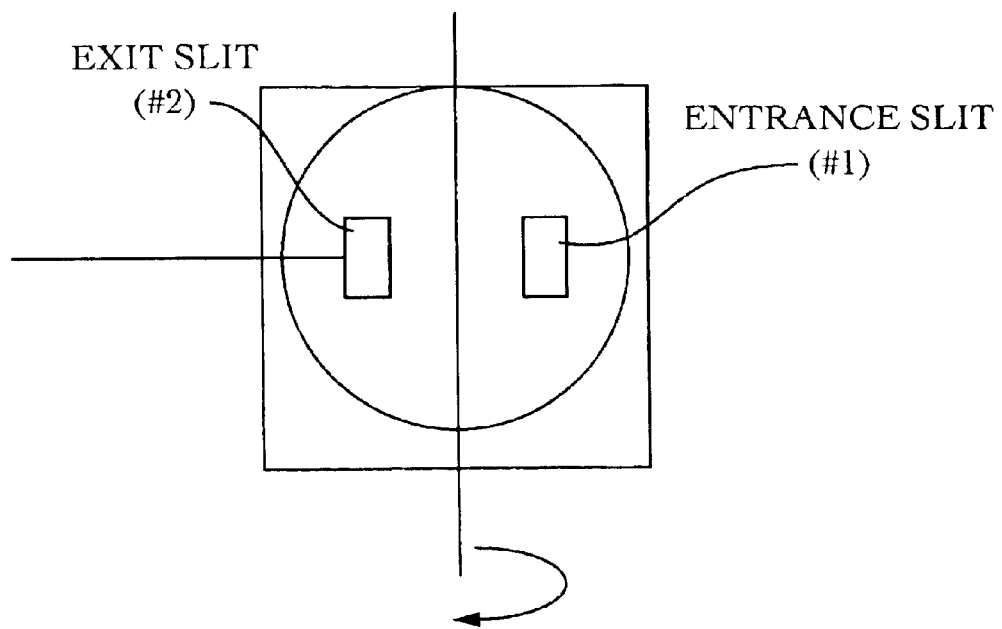
FIG. 19 is a schematic view of a conventional monochromator in the Czerny Turner or Ebert configuration.

A principal feature of the spectral instrument disclosed herein is a unique optical path monochromator. Modern monochromators utilize a dispersive element, usually a concave, holographic grating, and two apertures, commonly called "slits". One aperture, called the "entrance slit", focuses white light or a broad band optical beam entering the monochromator on the grating. The other slit, called the "exit slit", allows monochromatic light to exit the monochromator. The grating rotates about on optical axis to select which wavelength of light passes through the exit slit. The position of the slits relative to the optical axes of the grating determines the configuration of the monochromator. Monochromators to date have been designed with the slits on one axis and separated symmetrical with respect to the other axis. The slits are separated in the dispersive axis in the Czerny Turner or Ebert configuration see FIG. 19.

Figure 20:
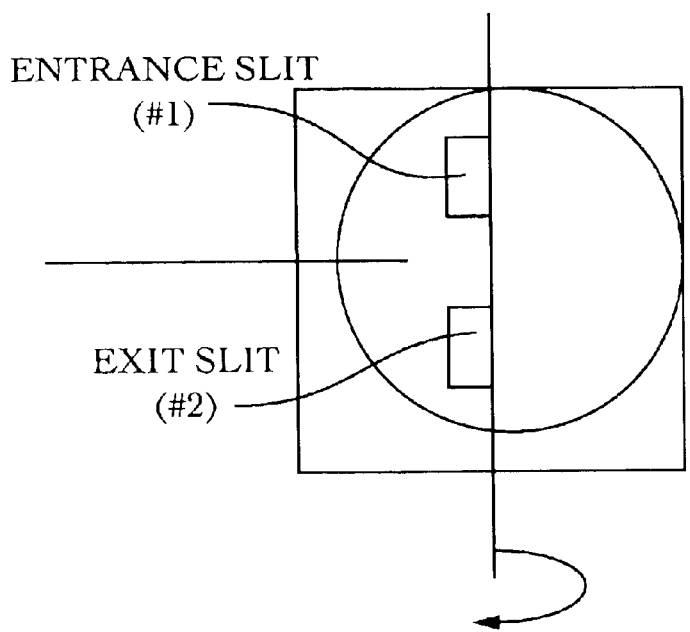
FIG. 20 is a schematic view of a conventional monochromator in the Litrow configuration.

In other monochromators, the slits are separated in the non-dispersive axis in the Litrow configuration shown in FIG. 20.

Figure 21:
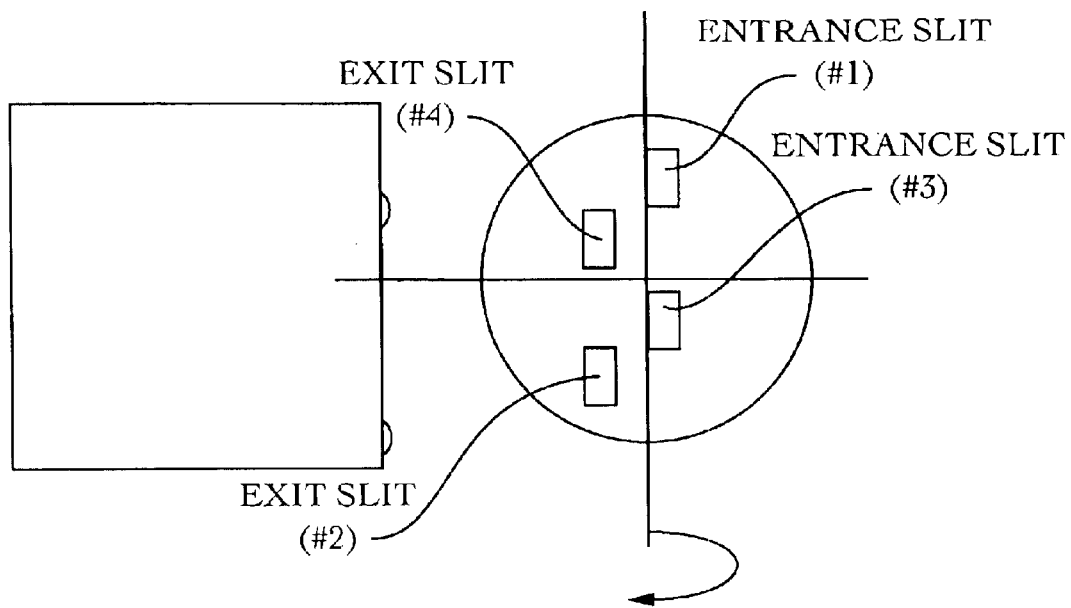
FIG. 21 is a schematic view of the arrangement of entrance and exit slits in the present invention, called the "River configuration".

The invention described herein moves the slits off both axes as shown in FIG. 21. This new configuration will be called the "Ryer" configuration.

This innovative configuration, shown in FIG. 21, allows light to pass through the monochromator twice without interference. In order to expain the manner in which this spectral instrument works, the slits identified and noted in the sketches of FIGS. 20 and 21 and those sketches that follow, will be used. Further, with the understanding that the optical spectrum includes more than visible light wavelengths, reference will be made frequently to the visible light frequency spectrum.

White light enters the instrument through slit #1 (first Entrance Slit). The light is dispersed by the grating and exits via a first exit slit #2. The light is reflected from a mirror and reenters the monochromator through a second entrance slit #3 and is further dispersed. It exits the monochromator portion of the instrument through slit #4 (second Exit Slit). An instrument using this monochromator configuration, therefore, has the benefits of a double monochromator without the cost or disadvantages associated with the use of two distinct monochromators. The spectral instrument can be considered as having two (2) monochromators.

A variety of elements are needed to implement the monochromator in a practical system. First the light being measured must be focused on the entrance slit #1. This is done by appropriate input optics. Second, the monochromatic light exiting slit #2 must be redirected to slit #3. A prism mirror inside the monochromator and a field lens and return mirror outside the monochromator accomplish this task in the monochromator portion of the instant invention. Other configurations can easily be developed for the same purpose. Third, the light exiting the instrument via the final exit slit #4 or simply exit slit #4 must be directed to a detector if the objective of the spectral instrument is to measure the light—or to output optics if the spectral instrument is being used to generate monochromatic light for other purposes. A pair of mirrors and a relay lens outside the monochromator portion of the instrument accomplishes this objective. Again, other devices could be used to perform these functions.

The light must be modulated or "chopped" between passes through the monochromator to achieve maximum benefit of the double pass system. A motor driven "chopper wheel" placed between slit #2 and slit #3 accomplishes this task in the current invention. Modulated light exiting the system from the exit slit #4 can be discriminated from continuous light exiting the system. The signal measured during the time when light is blocked from reentering the monochromator is subtracted from the signal received when light is permitted to reenter the monochromator. This allows only light that passed through the monochromator twice to be measured.

Note that other multiple path, non-interfering configurations can be designed. For example, the traditional Ebert and Litrow design could be combined. Also, a third or fourth light path could be created by incorporation of additional off-axis slit positions.

Figure 22:
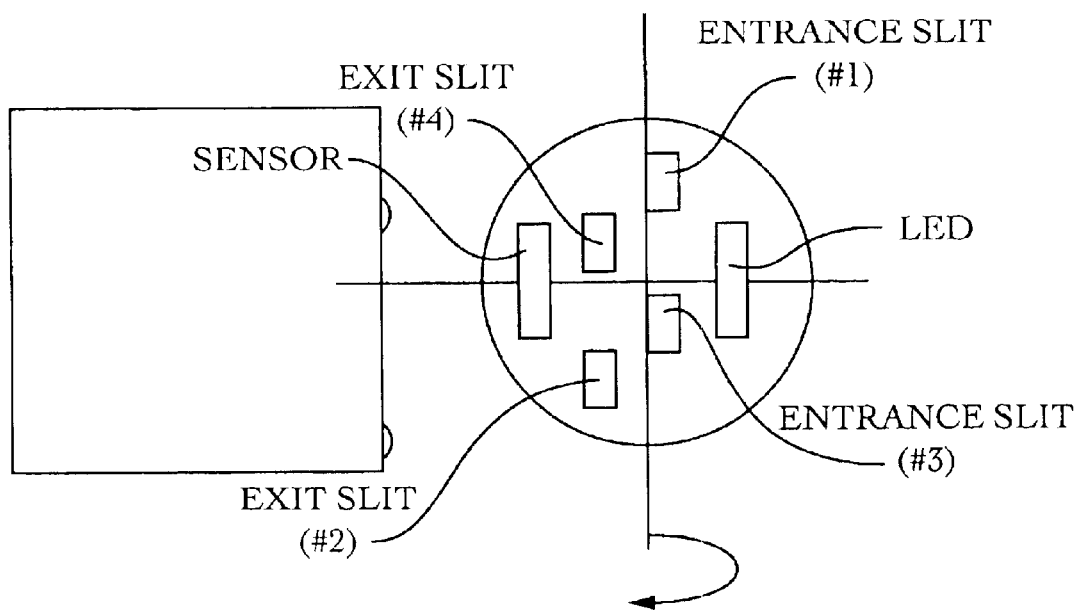
FIG. 22 is a schematic view of the invention using an independent light source and an independent sensor, in this example view mounted in the "Ebert" configuration.

Additionally, there may be incorporated into the system the use of an independent light source and independent sensor mounted in the monochromator on one of the two optical axes to allow initialization and verification of the position of the grating. These components are mounted in the "Ebert" configuration in the example system as shown in FIG. 22, but could also be mounted in the "Litrow" configuration.

The initial position of the grating can be exactly and repeatably set by positioning it so that the light from the LED is focused on the sensor. This occurs when the grating is acting as a mirror and is at its "blaze angle" or geometric center. This position is the starting point from which all other movements of the grating are calculated. Since this initial position is determined optically using the grating, it is more precise than an initial position determined from a secondary mechanical feature of the grating drive system such as a numeric identifier for a rotational position of the stepper motor which causes the movement of the grating element. Moving the grating is the method by which the monochromator selects the wavelength of light to be produced for measurement or other purpose. A known starting point for grating motion, therefore, is essential to determining subsequent grating position and the wavelengths being produced. For initialization, the grating component is used as a mirror (blaze angle) and for verification the grating component is used as a dispersive element i.e., in the diffraction mode.

The same light source and sensor can be used to verify the accuracy of the position of the grating operating in the dispersive mode. If the source produces light at a single wavelength or a narrow band of wavelengths, as does an LED, the grating can be moved to this wavelength position and the sensor can be read. If the sensor reads a maximum signal at or very close to this position, the system can be assumed to be working correctly. If not, diagnostics can be performed to identify the source of the problem and correct it.

The unique feature of this design is that the light source and sensor do not interfere with the normal operation of the system since they are put on the optical axis of the grating while the slits used to input and output the light being processed are put off-axis. Note that it is possible to include two non-interfering on-axis source/sensor pairs by putting one on each axis. It is also possible to practice this innovation if the primary light path is configured in one of the two conventional configurations.

Figure 12:
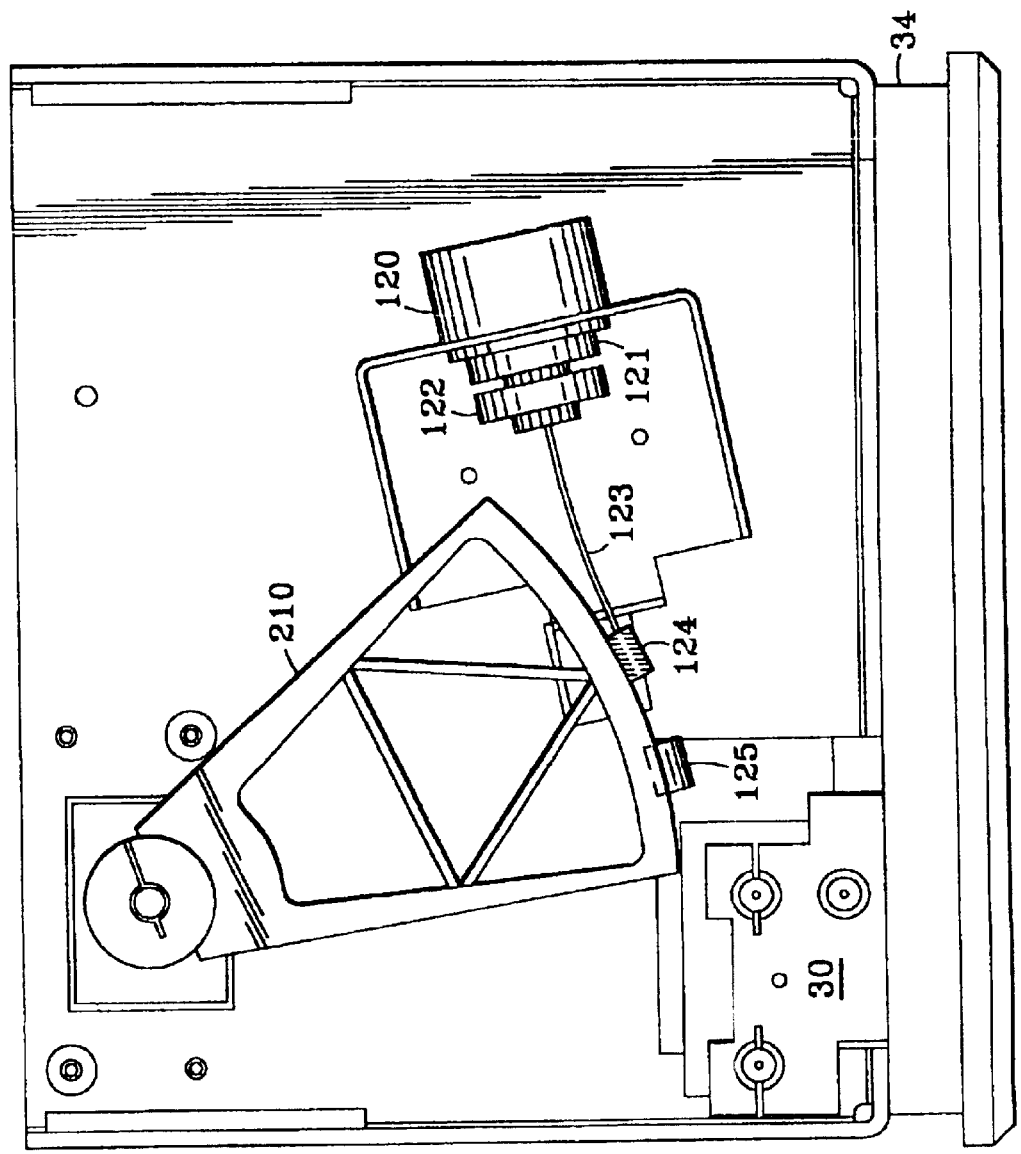
FIG. 12 is a plan view sketch showing the grating assembly drive components.
Figure 13:
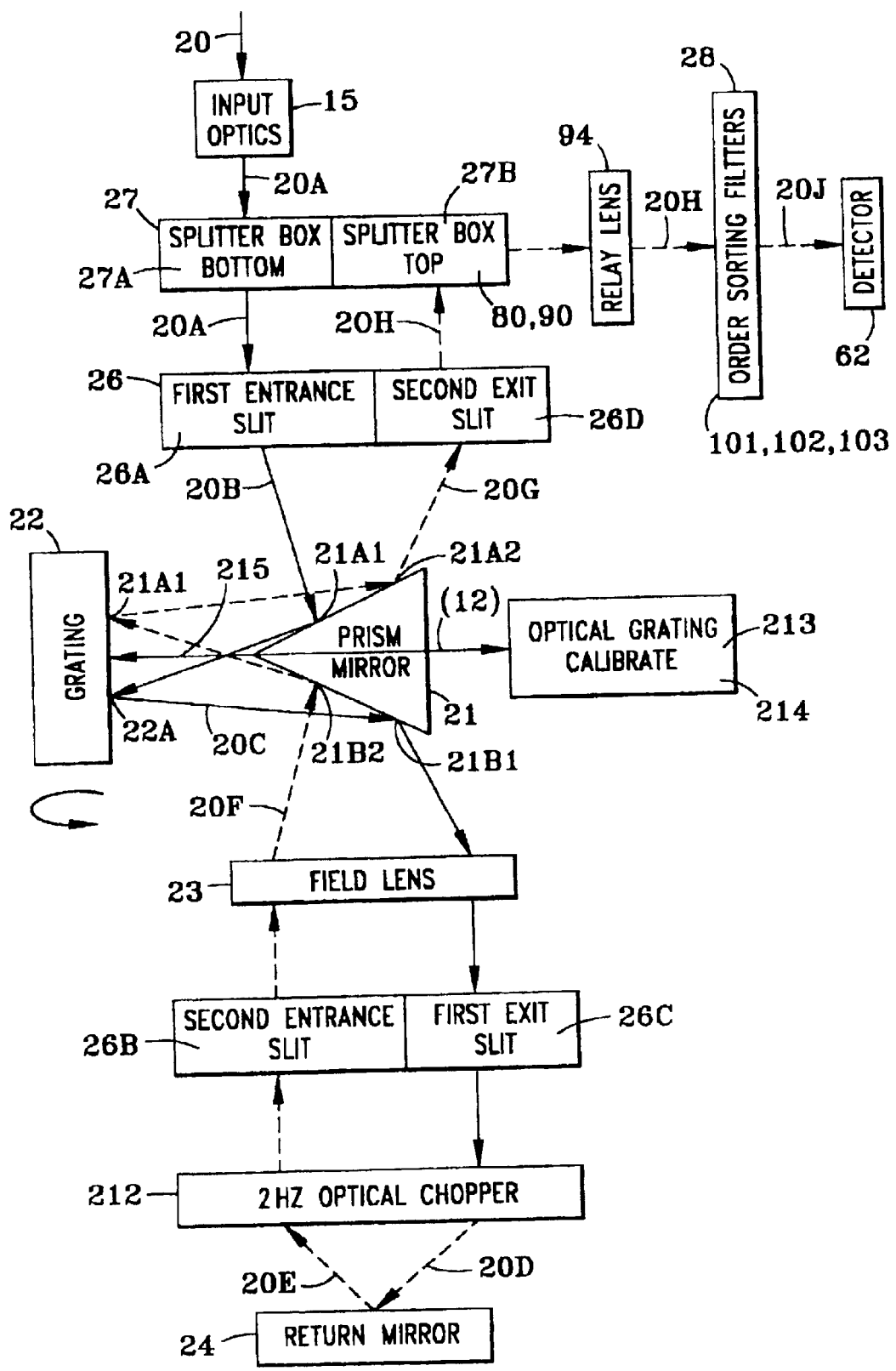
FIG. 13 is a block diagram of the optical path of an optical beam through the spectrometer.
Figure 14:
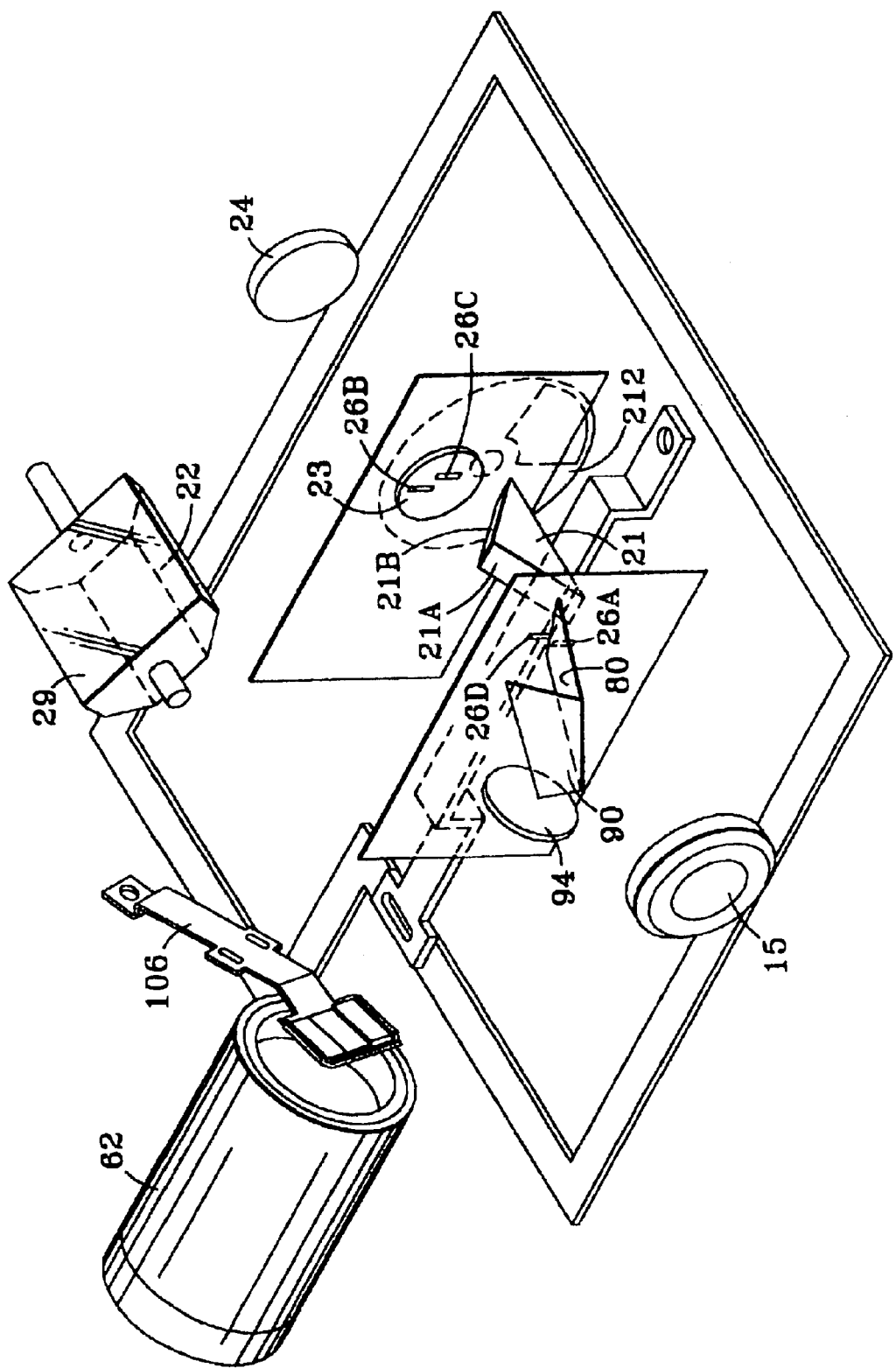
FIG. 14 is a front top right view perspective sketch showing the relative positions of the beam directing and the beam altering optical components and detection components.
Figure 15:
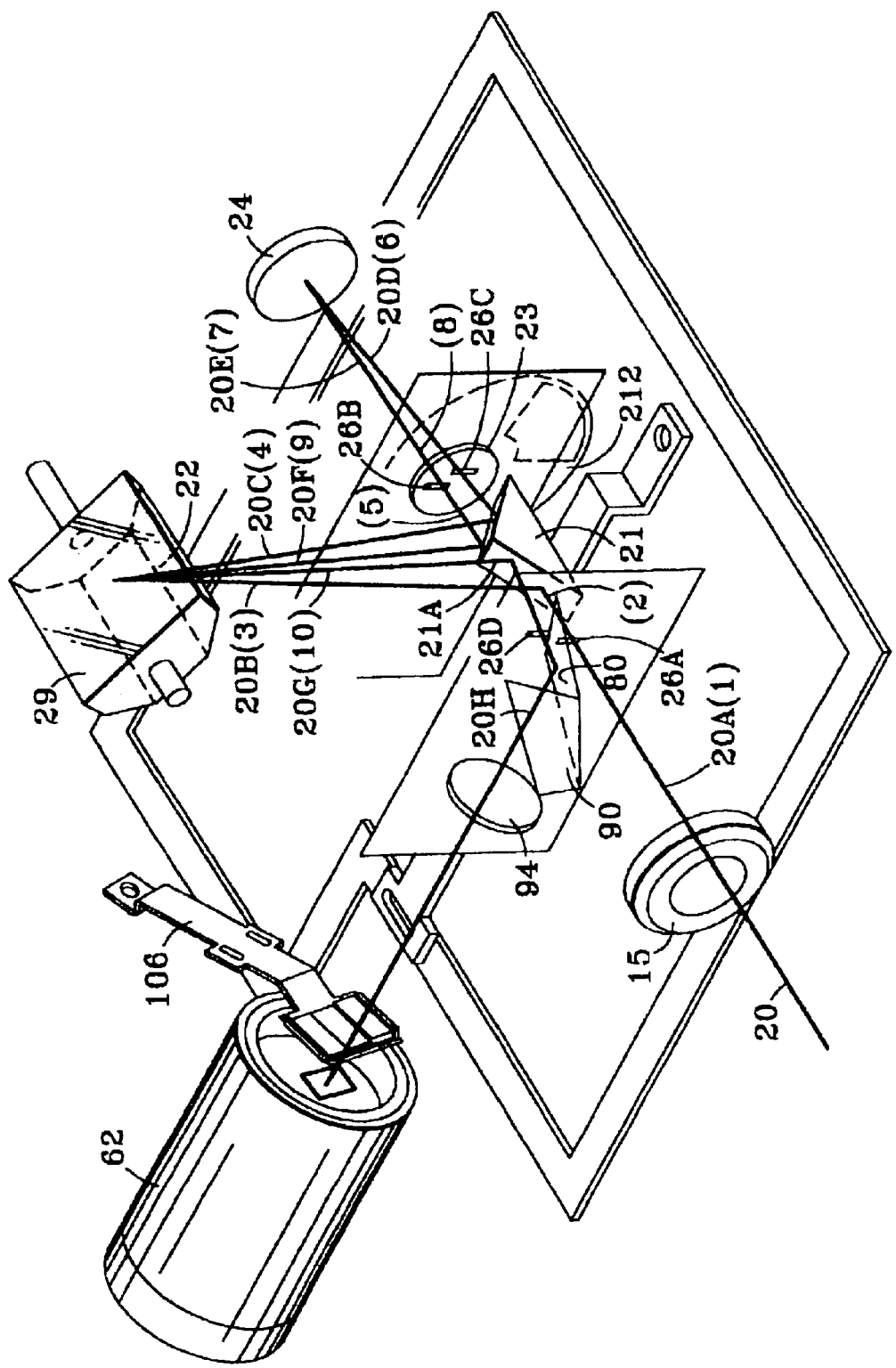
FIG. 15 is an illustration of the in path and the out path taken by an optical beam directed and altered and measured by the components.
Figure 16:
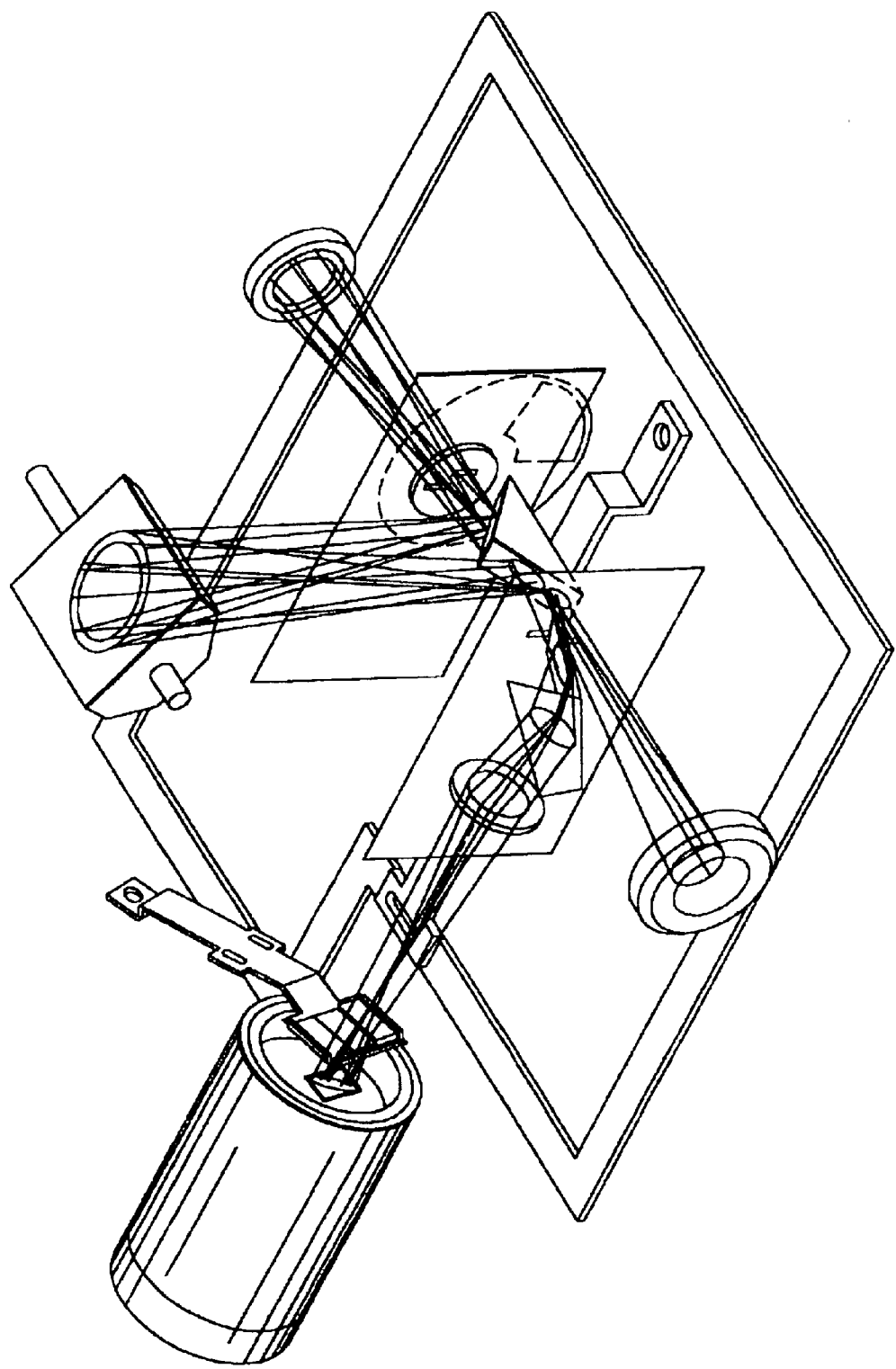
FIG. 16 is an illustration of the optical beam using multiple lines to represent the fact of multiple frequency/wavelength components of the beam and the simultaneous diffraction of such beam by the spherical, concave, hyperbolic grating component.

Referring now to FIGS. 2–12, and optical path block diagram FIG. 13, input optical beam 20 enters spectral instrument 12 through input optics 15. Beam 20 is modified appropriately by input optics 15 creating thereby entrance beam 20A. Entrance beam 20A is directed to splitter box 27 and in particular to splitter box bottom portion 27A. As a part of splitter box bottom portion 27A there is a first entrance slit 26A through which entrance beam 20A passes creating thereby first entrance slit beam 20B. First entrance slit beam 20B is modified from entrance beam 20A in that the geometric shape of beam 20B has a cross section dimension about equal to the width by the height dimensions of entrance slit 26A. Entrance slit 26A is recessed in a separate light-tight chamber to trap and eliminate off-axis radiation from entering through slit 26A and into what may be characterized as the monochromator chamber. This also reduces the space needed outside of instrument 12 for input optics, thereby keeping everything compact.

First entrance slit beam 20B impinges onto a first location 21A1 of a first reflecting surface 21A of prism 21 and is then directed by prism 21 to holographic (concave) hyperbolic grating 22 in a direction which is off-axis to the optical axis of grating 22. Entrance slit beam 20B is directed to grating surface location 22A from which beam 20B is diffracted or dispersed and is reflected from grating 22 and becomes first time refracted and reflected beam 20C. The direction of reflection from grating 22 of beam 20C, is such that the path is back to prism 21 but onto a second prism reflecting surface 21B at a first location 21B1. Second prism reflecting surface 21B then directs beam 20C to field lens 23 through which beam 20C passes on its way to first exit slit 26C through which beam 20C travels to optical chopper assembly 212. Chopper assembly 212 chops beam 20C creating thereby chopped beam 20D and directs chopped beam 20D to return mirror 24 which begins the return path for the now chopped mirror image beam 20E. Return mirror 24 is stabilized by return mirror kinematic support 30 (see FIG. 12).

Beam 20E travels through chopper assembly 212 and then through second input slit 26B to field lens 23 which directs mirror image beam 20E back onto second reflecting surface 21B at second location 21B2 of prism 21, and then again to grating 22 but again off-axis so that the diffraction and reflection is from grating surface location 22B. Grating 22 is used off-axis in both axes, and is used twice to reduce scatter by about a factor of 1000. This dual use of grating 22 also increases dispersion by a factor of two and eliminates any temperature-related mechanical spectral drift which is often present with two separate monochromators. Grating 22 again directs twice diffracted mirror image beam 20G to prism 21 which then directs beam 20G to second exit slit 26D. From second exit slit 26D, beam 20G is again discriminated and now becomes, beam 20H which is directed into splitter box 27 (referring to FIGS. 8, 9), particularly the splitter box top portion 27B where it is first redirected by first turning mirror 80 and then again redirected by second turning mirror 90 towards relay lens 94. Beam 20H leaves splitter box 27 and travels to order sorting filter assembly 28 which holds filters 101, 102, and 103 (see FIG. 10). Filters 101, 102, and 103 are held in assembly 28 by means of filter support arm 106. Pivoting of filters 101, 102, and 103 is enabled through pivot bearing 107 and the cooperative action of solenoids 104 and 105. Filters 101, 102 and 103 are located inside instrument 12 housing to reduce stray light and to facilitate a fast-acting change of filters occurring in the middle of a scan.

Figure 6:
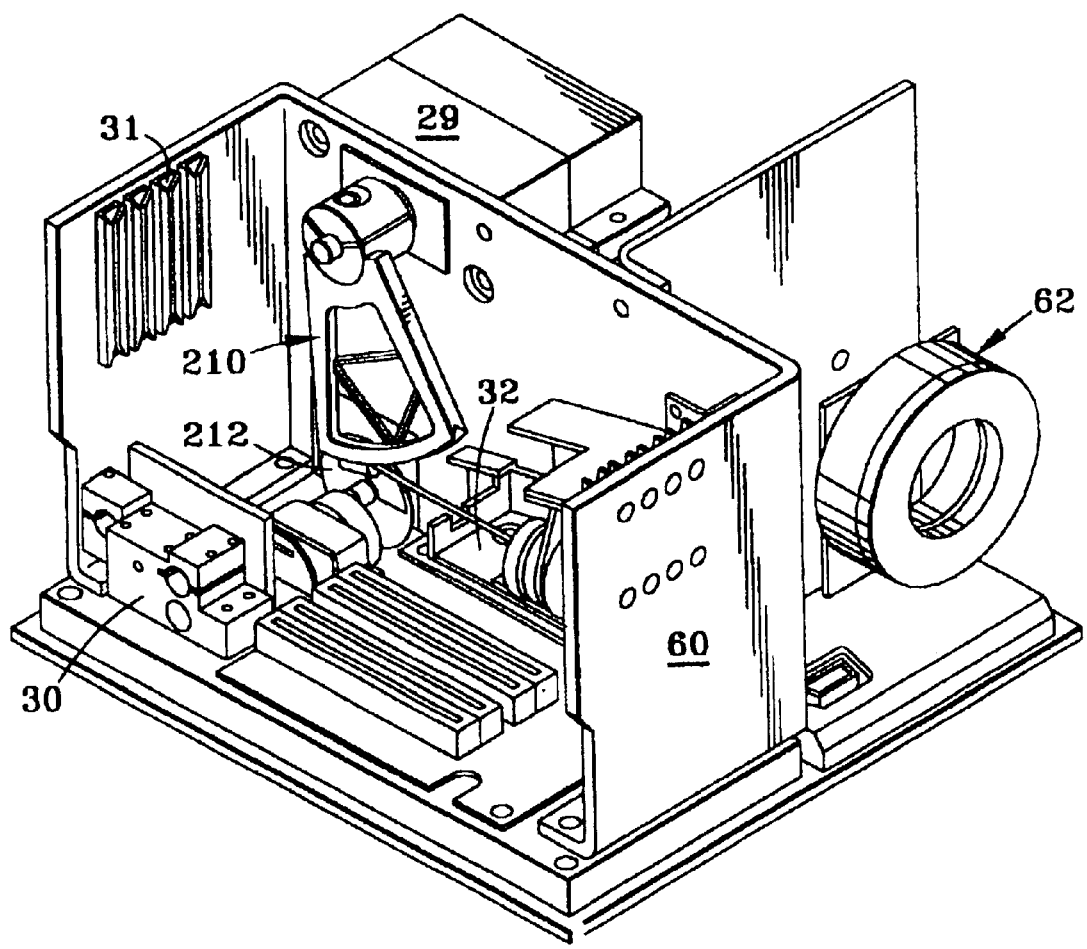
FIG. 6 is an isometric view from the top left side and rear of selected components of the instrument.
Figure 7:
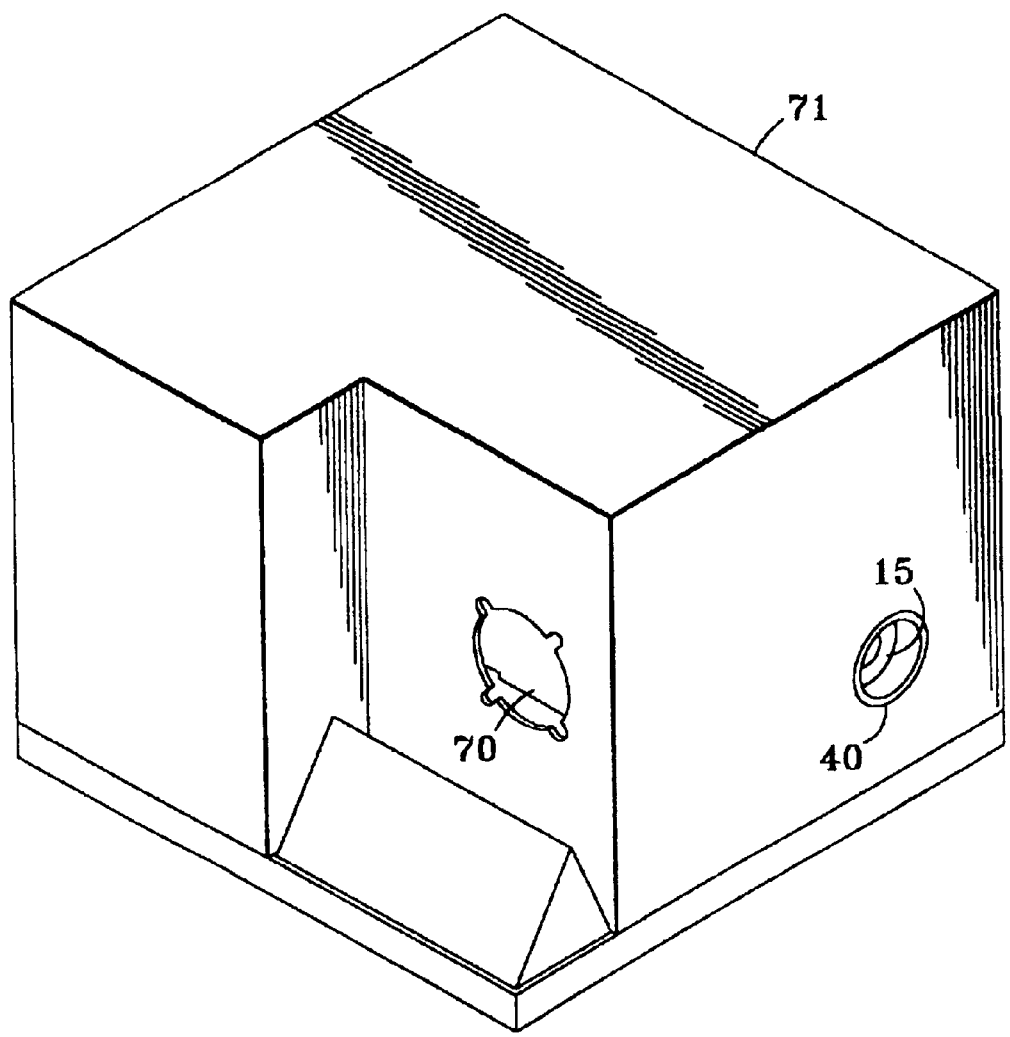
FIG. 7 is an isometric view showing the instrument having a cover with the input aperture and the detector aperture.
Figure 8:
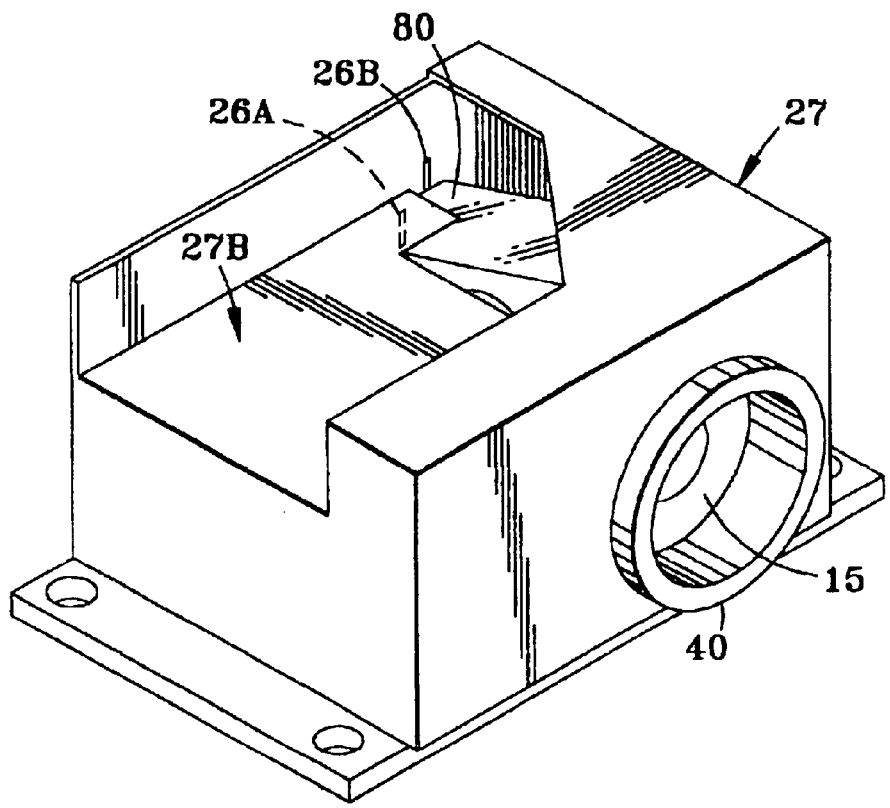
FIG. 8 is an isometric view showing the input aperture, the splitter box, the entrance slit and the exit slit and the upper and lower portions or sections of the splitter box.
Figure 9:
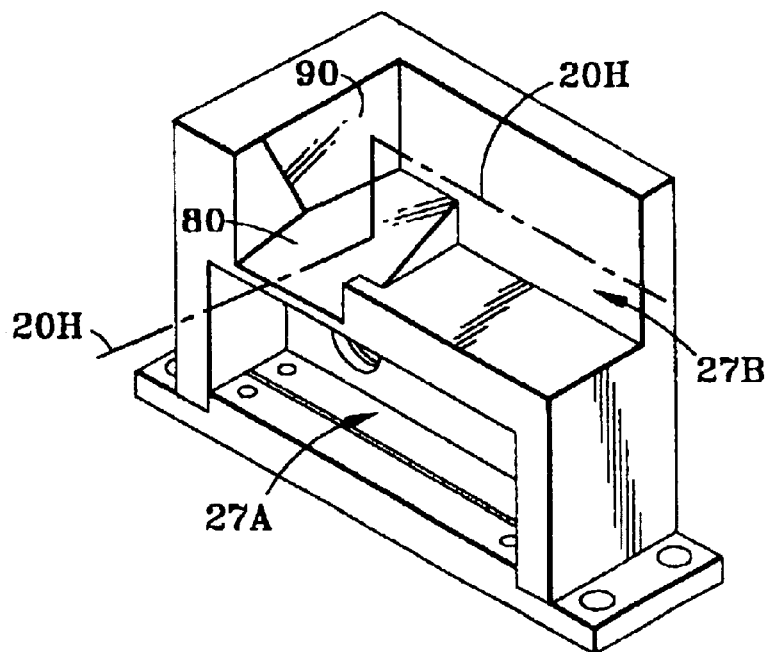
FIG. 9 is an isometric view showing an interior view of the splitter box and the path of the exit beam caused by the turning mirrors.
Figure 10:
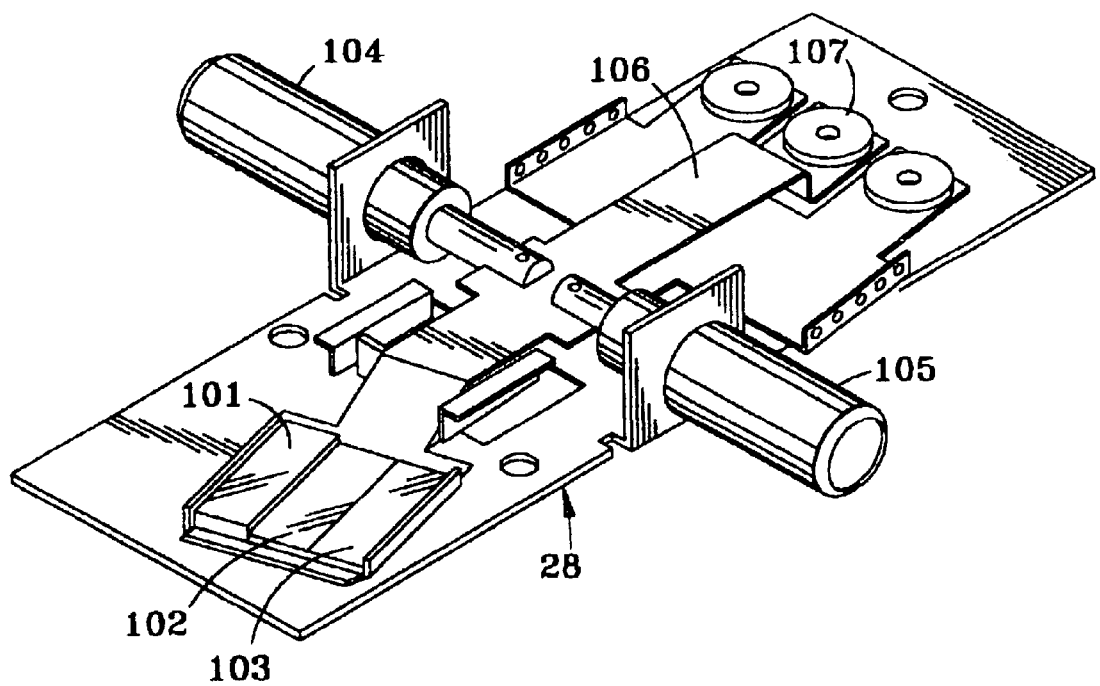
FIG. 10 is an isometric view of the order sorting filter assembly.
Figure 11:
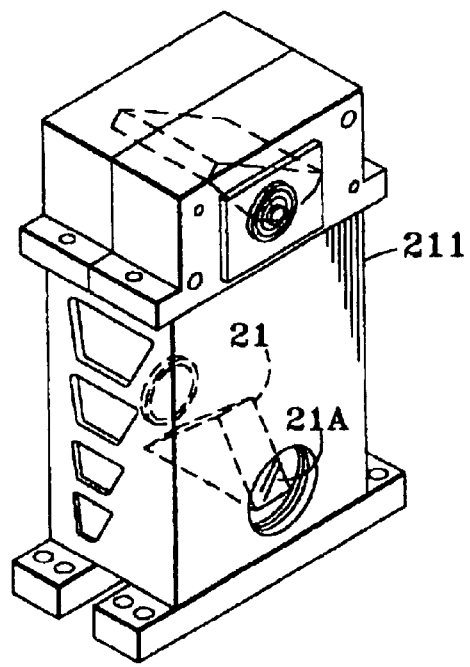
FIG. 11 is an isometric view of the grating tower with the grating assembly, prism and the grating tower exit aperture in shadow.

After passing through order sorting filters 101, 102, and 103, now beam 20J is directed into order sorting filter exit aperture 50 and on into detector 62 mounted in detector mounting port 70 (see FIG. 7) on detector bulkhead 61 (see FIG. 6). Locating the detector amplifier inside the instrument cabinet reduces electromagnetic interference and shortens detector 62 cable while still allowing for a change of detector. Spectral instrument 12 contains an amplifier, preferably a "lock-in" amplifier to enable low noise detectivity which signal is integrated over five seconds at each wavelength during "extended scan" mode. In addition, weak signal gain compensation guarantees 1,000,000,000:1 change in signal detection while maintaining linearity.

All optical components are mounted on 1-inch thick base plate 34 (see FIG. 12) which minimizes outside influences from affecting any alignment. Bulkheads 60, 61 and 70 (see FIGS. 6 and 7) are arranged in a "T" configuration to increase the rigidity of the vertical opto-mechanical components. The air-tight cabinet with cover 71 has two $\frac{1}{16}^{th}$-inch barbed fittings allowing for nitrogen purge to preserve the optics, eliminate dust, and allow for outside field measurements without degradation of the measurement.

Figure 3:
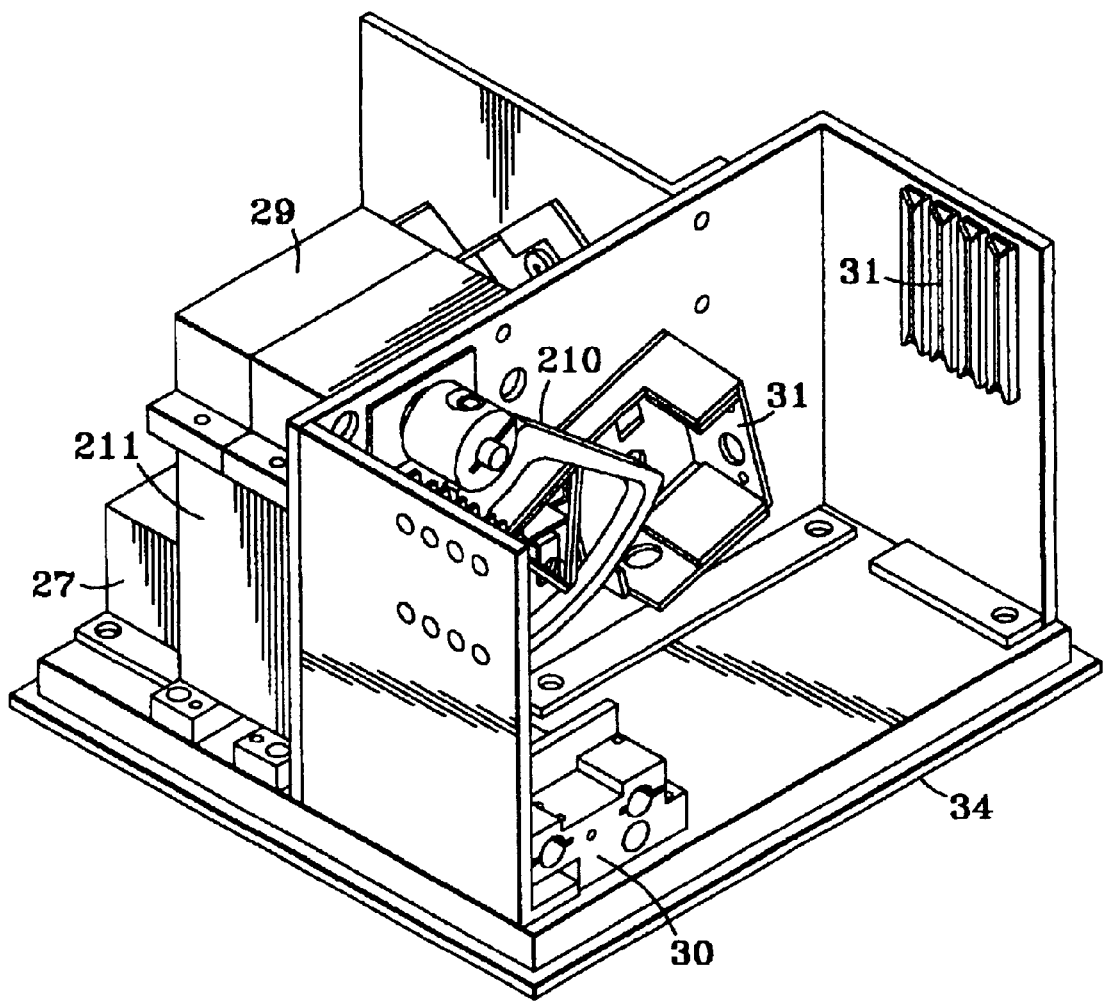
FIG. 3 is an isometric view from the top right side and rear of selected components of the instrument.

Referring now to FIG. 3, Grating 22 is housed in grating tower 211 (see FIG. 11) which holds grating carrier assembly 29 and grating drive sector 210. Because grating 22 moves during the operation of system 10 and particularly instrument 12, grating 22 is "caged" during shipping. Referring to FIGS. 6 and 12, when sector drive stepper motor 120 (mounted on stepper motor support 32) receives an input signal which is intended to cause the caging of or the securing of the grating drive sector, stepper motor moves sector drive into a position where worm drive 124 becomes "caged" by worm cage 125.

It is important to eliminate or substantially reduce backlash in the movement of grating 22. This elimination of backlash is achieved by means of fixed anti-backlash magnet 121 and slip coupled anti-backlash magnet 122 which couple to flexible torsion drive shaft 123. Worm drive 124 and the teeth in drive sector 210 are designed to eliminate backlash between these two components. This sector drive system is balanced which makes it possible to mount instrument 12 on any mechanical axis without changing the wavelength.

When used for optical initialization, grating 22 is used for direct reflection of a beam, which guarantees the spectral accuracy no matter what happens to the other components of the grating motion system. Along these same lines, an internal on-axis wavelength checking system gives added certainty to the wavelength precision and stays out of the optical path of the off-axis optical system. Wavelength checking consists of a GaAs source and silicon receiver with junction temperature measuring circuitry. By knowing the temperature of the source and the wavelength shift due to temperature, the accuracy is easily tested by taking any reading.

Figure 4:
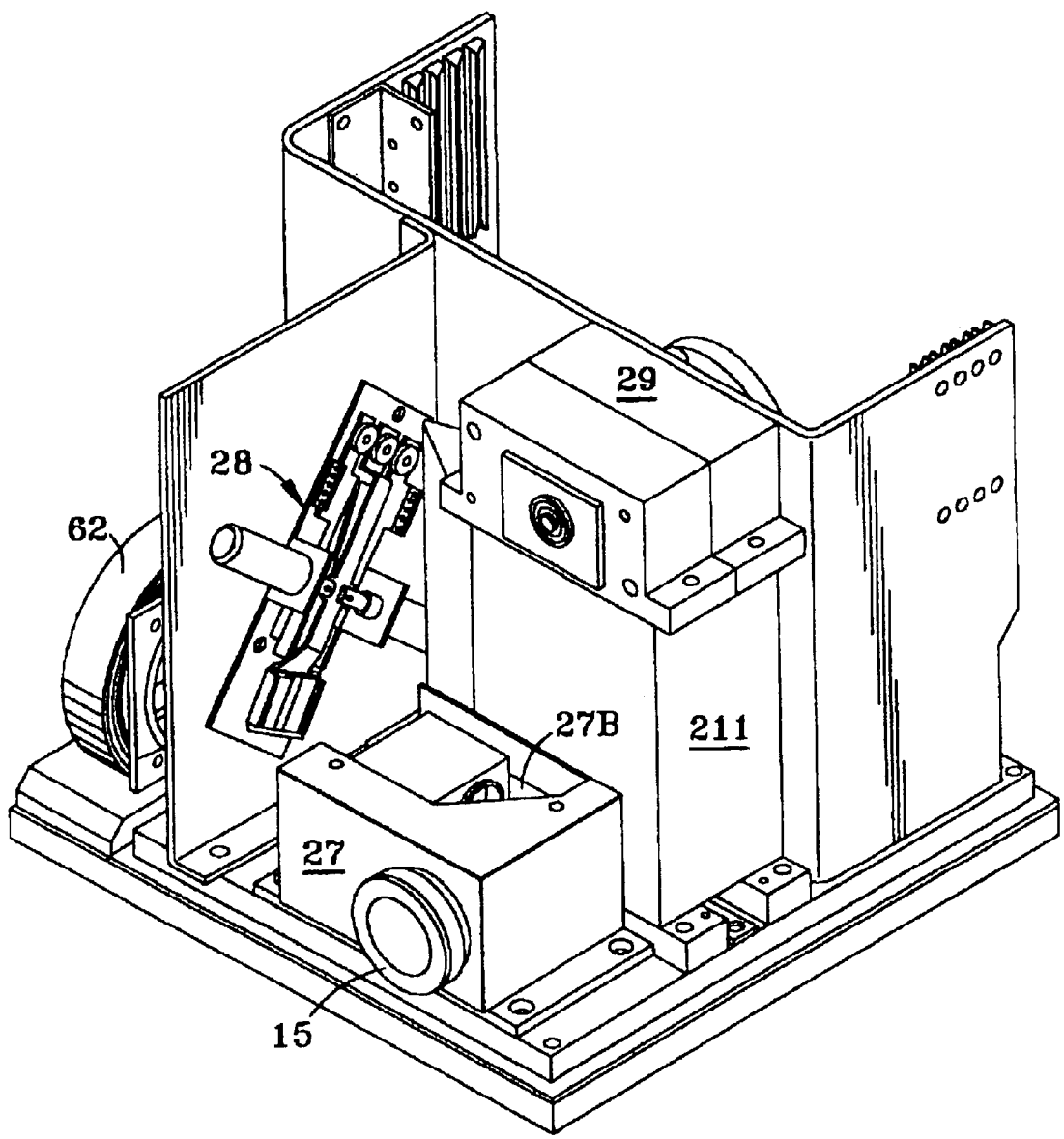
FIG. 4 is an isometric view from the top right side and front of selected components of the instrument.
Figure 5:
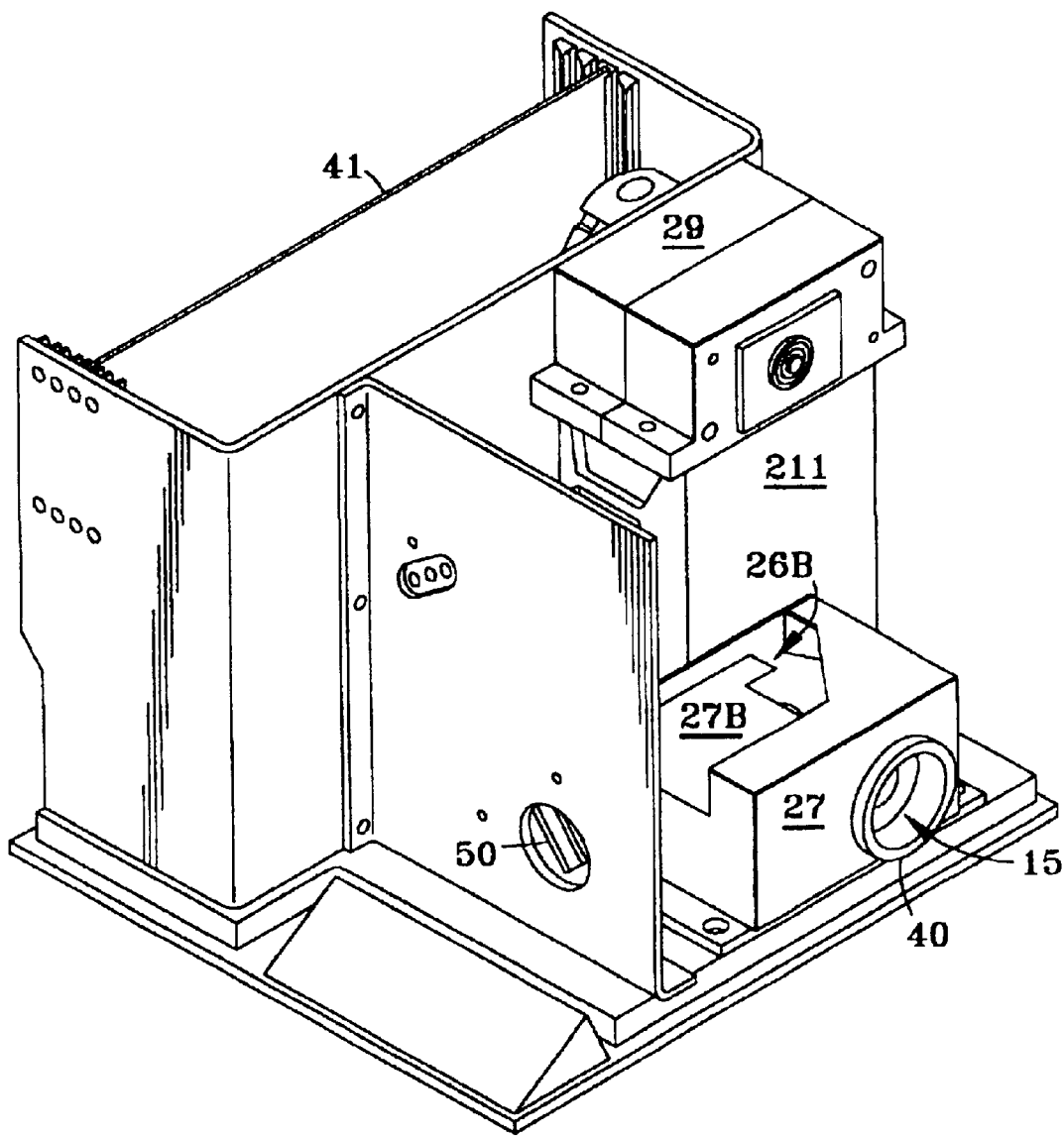
FIG. 5 is an isometric view from the top left side and front of selected components of the instrument.

FIGS. 3, 4 and 6, disclose that spectral instrument 12 operates by means of a micro-computer and control circuitry that are located on one of a plurality of printed circuit boards 41 that are housed in circuit board support guides 31. The logic to interpret at least 38 commands is located on circuit boards 41.

Figure 17:
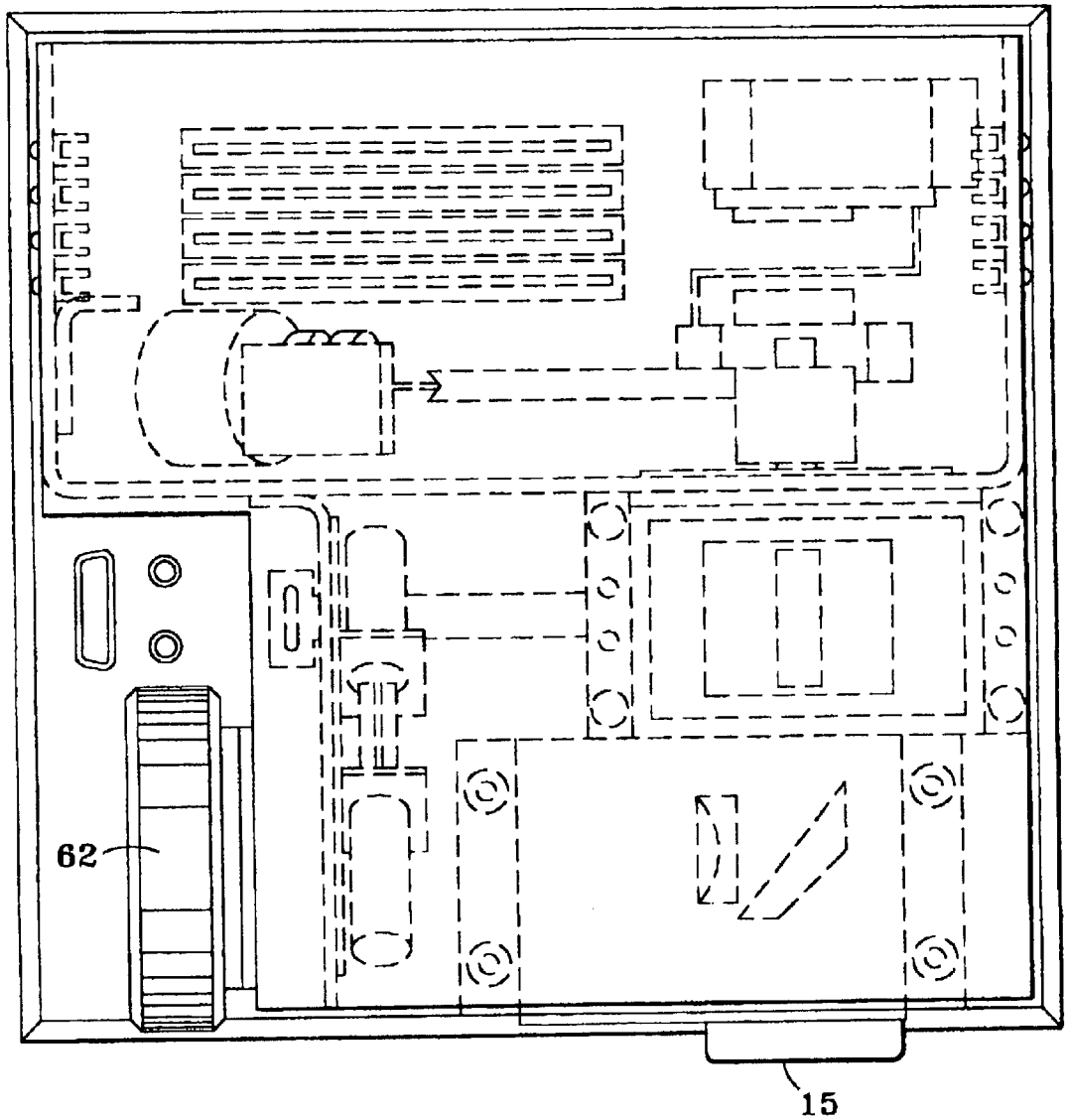
FIG. 17 is a top plan view of the instrument showing, in shadow, the locations of the many components of the instrument.
Figure 18:
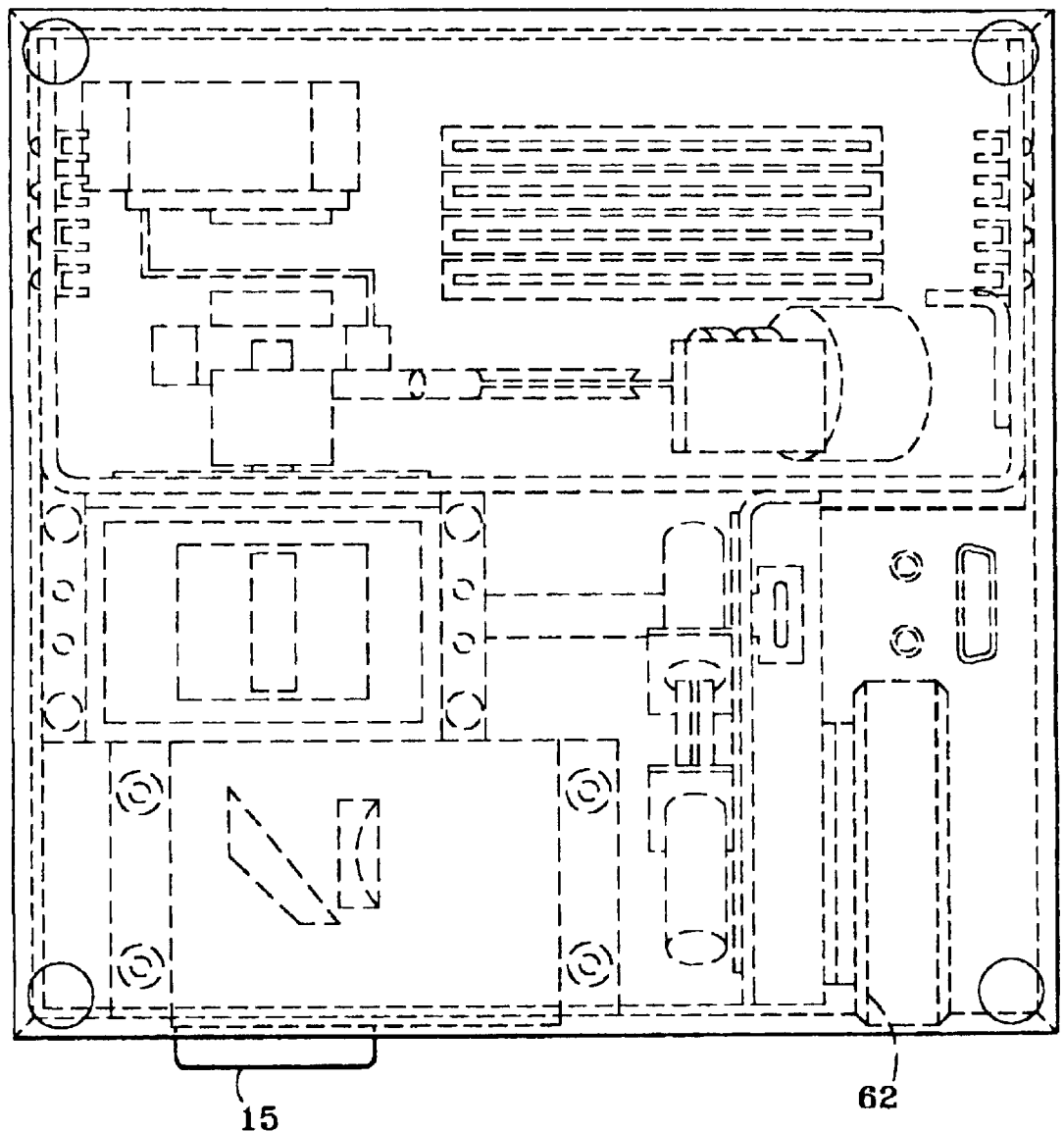
FIG. 18 is a bottom plan view of the instrument showing, in shadow, the locations of the many components of the instrument.

FIGS. 17 and 18 are plan views of instrument 12. FIGS. 17 and 18 illustrate the location in the preferred embodiment of instrument 12, of input/output connections, printed circuit board locations, indicator lamps and the like. Many of the components are disclosed in shadow. As well, the output portion of the instrument, the monochromator portion of the instrument, the grating and the grating drive mechanism, the order sorting assembly, splitter box, prism and like are all discernible in shadow in these FIGS. 17 and 18.

The Non-Interfering Beam Paths

FIGS. 13, 14, 15 and 16 best illustrate the invention in terms of a plurality of optical components and the functions performed and positional relationships of the components. The optical components define the paths (1)-(11) which an optical beam takes as a consequence of the optical components acting upon the optical beam. The beam designations are the same as previously used but will generally not be included here in order to focus more on the beam path aspects of the invention.

Assume there is an input optical beam 20 which passes through input optics 15, which input optics is selected from such as a wide angle lens, a narrow angle lens and fiber optics.

There is a first entrance slit 26A, upon which an entrance optical beam 20A, (derived from an input optical beam 20), is directed in first path (1). The first entrance slit creates a first entrance slit beam 20B which has a cross section dimensions substantially equal to the cross section dimensions of first entrance slit 26A. There is a first location 21A1 on prism first reflecting surface 21A upon which the first entrance slit beam is directed in second path (2). Prism first reflecting surface 21A directs the first entrance slit beam on third path (3) to grating component 22 and particularly to grating first location 22A. The first entrance slit beam is thereby diffracted by grating component 22 creating a first diffracted beam which first diffracted beam is reflected by grating 22 in fourth path (4) from the grating component surface location 22A to first location 21B1 on prism second reflecting surface 21B. Note that the grating disperses the beam into spectral lines, i.e., the beam from the grating is spatially dispersed frequency components/wavelengths. Field lens 23 upon which the first diffracted beam is directed on fifth path (5) from the prism second reflecting surface focuses and directs the first diffracted beam and a defined and selected portion of the optical spectrum of the first diffracted beam onto first exit slit 26C. The first exit slit thereby discriminates and produces a narrow bandwidth beam of optical wavelengths. Return mirror 24, upon which the narrow bandwidth beam is directed on sixth (6) path, creates a mirror image beam of the narrow bandwidth beam and directs this beam on seventh path (7) back to the field lens. The return mirror initiates the creation of a return beam having the same modulation and frequency characteristics. However, importantly, the return beam is the mirror image of the first diffracted and discriminated beam. The spatial distribution of the wavelengths is a mirror image.

Second entrance slit 26B, upon which the mirror image beam is directed on eighth path (8) by the field lens, provides further discrimination of the mirror image beam. Second location 21B2 of the prism second reflecting surface 21B is where the discriminated mirror image beam is directed. From this second location the discriminated mirror image beam is directed on ninth path (9) to the grating component and particularly to grating second location 22B. This mirror image beam is again diffracted or dispersed by the grating component creating a diffracted discriminated mirror image beam which is reflected on tenth path (10) from the grating component surface to second location 21A2 on the prism first reflecting surface 21A. There is second exit slit 26D upon which the second location on the prism first reflecting surface directs, on eleventh path (11), the diffracted discriminated mirror image beam providing a second discrimination of the diffracted mirror image beam.

Additional features to the instrument are all directed toward enhancing the performance and to increase the functions the instrument can perform. For example there may be a means for chopping at a predetermined chop rate, any optical beam within the spectral instrument. The means for chopping is preferably positioned in the path of the first diffracted beam and the mirror image beam. So the spectral instrument may scan the spectrum, there is provided a drive mechanism which provides the means for moving the grating component thereby selecting the wavelength thereby selecting the wavelength discriminated by both said first exit slit and said second exit. A turning mirror directs therefrom, the diffracted discriminated mirror image beam into an instrument output portion wherein may be located an order sorting filter followed in the path by a detector and perhaps a detector amplifier preferably a lock-in or phase locked amplifier. And there may be means for optical initialization and a means for verification of wavelength using, on-axis, the grating component and a known wavelength source. Path (12) (see FIG. 13) is the on-axis path for the beam of known wavelength produced by source 213. The initializing beam is reflected from on-axis location 22C of grating 22 and is reflected back to initializing detector 214.

In general is noted that dispersing the incoming optical beam (or light) twice with the same grating, the first time dispersing continuous light and the second time dispersing chopped light, has many benefits. The purity, i.e. the absence of appreciable scatter of the measured light is greatly enhanced by the second dispersion by the grating. Modulating the light before the second dispersion pass allows the desired wavelength of light to be discriminated from the other wavelengths of light that might remain after the first pass to the grating. Also, since the return beam is a mirror image of the original beam, the grating diffracts only the desired frequency of light and reflects it to the exit slit. This further narrows the bandwidth of the light going to the detector without the necessity of additional narrow slits and resulting alignment issues. Since only one grating is used in the system, maintaining positional correspondence of two gratings in the face of mechanical and thermal changes is not an issue.

The Concave Holographic Hyperbolic Grating

The preferred means for diffraction is a concave spherical shaped grating with a specially configured hyperbolic shaped holographic grating surface designed to diffract and reflect the beam off-axis, i.e. not using the optical axis of the grating structure. The specially designed grating is moveable through a defined number of degrees—about 25 degrees—about an optical axis of the grating structure. Because of the specially designed grating structure, the grating can cause the concurrent diffraction of a plurality of incident optical beams, each of which beams have different angles of incidence and different angles of reflection. It is important to note that the path of the incident and the reflected beam to and from the grating is "off-axis". That is, the beams going to and from the grating do not use the optical axis of the grating structure. The grating structure in effect diffracts the incident beam, i.e. spatially separates the incident beam so as to locate the different wavelengths in spatial relationship and reflect this spatial spectrum in a predetermined direction. A portion of the spatial spectrum, i.e. the diffracted beam, impinges on a slit which selects that wavelength which is incident to the slit. The portion of the spatial spectrum impinging on the slit and consequently the frequency/wavelength of the optical signal which is selected, is a function of the moveable position of the grating structure. Use of this grating structure concurrently by more than one non-interfering beam of spectral energy has many advantages over the sequential use of separate monochromators.

Particularly, the present invention provides for a double pass through the grating to increase dispersion, reduce scatter while maintaining a perfect temperature independent spectral match for the second pass. Using the grating twice reduces scatter by about a factor of 1000, increases the dispersion by a factor of two, and eliminates any temperature-related mechanical spectral drift which often is present with two separate monochromators.

Means for Initializing and Verification of Instrument

There is also a means for automatically initializing instrument 12 using a source of known wavelength 213 and also for verifying the accuracy of the measured characteristics of the incoming optical beam 20. In the verification and initialization modes, the known wavelength such as an infrared LED source 213 directed on-axis path (12) and is dispersed by grating 22 and reflected by grating 22 at location 22C. I.e., the energy beam 215 is this time "on-axis" that is, it is on the optical axis of diffraction grating element 22. A detector or receiver 214 of the known signal 213 dispersed on-axis from grating surface 22C is measured by the calibrated and known receiver which can then be compared with the dispersed incoming signal. The position of stepper motor 120 and consequently the worm gear drive system which provides the angular movement of grating 22, is automatically set so that the calibration wavelength, the LED source 213, is caused to be over the first discriminator slit i.e., first exit slit 26C of instrument 12.

It is thought that the present invention, the method and the system and the device for use in the field of spectrometry, and many of its attendant advantages are understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A spectrometer system, said system comprising:
   a spectral instrument wherein said spectral instrument comprises means for receiving optical wavelength energy; means for performing functions upon received, refracting, optical energy said functions being selected from the group consisting of receiving, refracting, reflecting, absorbing, directing, diffracting, dispersing, diffusing, focusing, chopping, filtering, detecting, amplifying, analyzing, comparing, and displaying; said functions performed being those of optical devices and optical instruments, said optical devices being selected from the group consisting of slits, splitting devices, prism devices, mirror devices, chopping devices, lenses and gratings, and said instruments being selected from the group consisting of monochromator, spectroradiometer, spectrophotometer and a spectral energy source; and
   a power module comprising means for providing to said spectral instrument, operating power, means for communicating, means for interconnecting said spectral instrument with a means for controlling said means br performing functions by said spectral instrument.

2. The spectrometer system according to claim 1 further comprising means for receiving commands from a list of commands, said means for receiving commands being at least one communications port located as part of said means for communicating and means for responding to each of said commands, said commands of said list of commands consisting of at least one command selected from the group consisting of power on and off, scan wavelengths including selection of start wavelength and end wavelength, read and display measured data, instrument calibration and validation, and cage drive mechanism.

3. The spectrometer system according to claim 1 further comprising software operable on a computer, said software providing means for remotely accessing, controlling functions, controlling performance, and controlling measurement and characterizing of measured data developed by said spectral instrument.

4. The spectrometer system according to claim 2 further comprising software operable on a computer, said software providing means for remotely accessing, controlling functions, controlling performance, and controlling measurement and characterizing of measured data developed by said spectral instrument.

5. The spectrometer system according to claim 1 further comprising means for comparing data developed by said spectral instrument when performing functions of one of said instruments, said means for comparing data being part of said means for controlling said means for performing functions by said spectral instrument.

6. The spectrometer system according to claim 3 further comprising means for comparing data developed by said spectral instrument when performing functions of one of said instruments, said means for comparing data being part of said means for controlling said means for performing functions by said spectral instrument.

7. The spectrometer system according to claim 4 further comprising means for comparing data developed by said spectral instrument when performing functions of one of said instruments, said means for comparing data benefit part of said means for controlling said means for performing functions by said spectral instrument.

8. The spectrometer system according to claim 7 further comprising programmable electronics and means to indicate malfunction located within said spectral instrument and connected to said power module and said means for communicating; wherein said means for indicating malfunction comprises at least one indicator light having an on state and an off state and connected to said programmable electronics, and wherein said programmable electronics control said state of said at least one indicator light wherein said state of at least one indicator light is related to said malfunction in said spectral instrument, such that a user can quickly determine if there is power or communication to the system.

9. The spectrometer system according to claim 1 further comprising means to control said means for performing functions wherein said means for control comprises:
  a set of commands, each command of said set of commands being transmitted to said means for communicating, wherein each command of said set of commands instructs said spectral instrument to perform a certain function of said functions; and
  a micro-computer and control circuitry incorporated into said spectral instrument for receiving said commands, interpreting said commands, and directing said spectral instrument to perform said certain function based on which said command is received.

10. The spectrometer system according to claim 1 wherein said spectral instrument further comprises:
  a plurality of optical components, each of which is oriented and located such that some optical components function to direct and define a plurality of beam paths for at least one optical beam of energy which enters said spectral instrument, and other optical components function to alter the nature of said optical beams wherein said beam paths are used concurrently and simultaneously and in a non-interfering manner by said optical beam traveling ever said beam paths; and wherein said optical components comprise at least one optical device that modifies said at least one optical beam, creating a modified optical beam, and directs said modified optical beam on a first beam path to a splitter device having a first entrance slit through which said modified optical be passes resulting in an entrance slit beam;
  said entrance slit beam is passed onto a prism device then onto a grating from which said entrance slit beam is diffracted, thereby becoming a reflected beam; said reflected beam is passed back to said prism device which then passes said reflected beam to a lens device and then to a first exit slit through which said reflected beam passes to an optical chopper device;
  said optical chopper device chops said reflected beam into a chopped beam and directs said chopped beam to a mirror device which creates a mirror image beam and passes said mirror image beam on a second beam path through a second input slit and back to said lens device;
  said lens device directs said mirror image beam back to said prism device and then back to said grating which then directs said mirror image beam again back to said prism device and to a second exit slit which directs said mirror image beam again back to said splitter device;
  said splitter device then redirects said mirror image beam to a second lens device which directs said mirror image beam to a filter assembly, thereby creating a filtered beam which is then directed to a filter exit aperture and into a detector which is communicatingly connected to said means for controlling; thus a plurality of beam paths are created and used simultaneously yet non-interferingly by and in said spectral instrument.

11. The spectrometer system according to claim 2 wherein said spectral instrument further comprises:
  a plurality of optical components, each of which is oriented and located such that some optical components function to direct and define a plurality of beam paths for at least one optical beam of energy which enters said spectral instrument, and other optical components function to alter the nature of said optical beam wherein said beam paths are used concurrently and simultaneously and in a non-interfering manner by said optical beam traveling over said beam paths; and wherein said optical components comprise
  at least one optical device that modifies said at least one optical beam, creating a modified optical beam, and directs said modified optical beam on a first beam path to a splitter device having a first entrance slit through which said modified optical beam passes resulting in an entrance slit beam;
  said entrance slit beam is passed onto a prism device then onto a grating from which said entrance slit beam is diffracted, thereby becoming a reflected beam;
  said reflected beam is passed back to said prism device which then passes said reflected beam to a lens device and then to a first exit slit through which said reflected beam passes to an optical chopper device;
  said optical chopper device chops said reflected beam into a chopped beam and directs said chopped beam to a mirror device which creates a mirror image beam and passes said mirror image beam on a second beam path through a second input slit and back to said lens device;
  said lens device directs said mirror image beam back to said prism device and then back to grating which then directs said mirror image beam again back to said prism device and to a second exit slit which directs said mirror image beam again back to said splitter device;
  said splitter device then redirects said mirror image beam to a second lens device which directs said mirror image beam to a filter assembly, thereby creating a filtered beam which is then directed to a filter exit aperture and into a detector which is communicatingly connected to said means for controlling; thus a plurality of beam paths are created and used simultaneously yet non-interferingly by and in said spectral instrument.

12. The spectrometer system according to claim 4 wherein said spectral instrument further comprises:

a plurality of optical components each of which is oriented and located such that some optical components function to direct and define a plurality of beam paths for at least one optical beam of energy which enters said spectral instrument, and other optical components function to alter the nature of said optical beam wherein said beam paths are used concurrently and simultaneously and in a non-interfering manner by said optical beam traveling over said beam paths; and wherein said optical components comprise at least one optical device that modifies said at least one optical beam, creating a modified optical beam, and directs said modified optical beam on a first beam path to a splitter device having a first entrance slit through which said modified optical beam passes resulting in an entrance slit beam;

said entrance slit beam is passed onto a prism device then onto a grating from which said entrance slit beam is diffracted, thereby becoming a reflected beam;

said reflected beam is passed back to said prism device which then passes said reflected beam to a lens device and then to a first exit slit through which said reflected beam passes to an optical chopper device;

said optical chopper device chops said reflected beam into a chopped beam and directs said chopped beam to a mirror device which creates a mirror image beam and passes said mirror image beam on a second beam path through a second input slit and back to said lens device;

said lens device directs said mirror image beam hack to said prism device and then back to said grating which then directs said mirror image beam again back to said prism device and to a second exit slit which directs said mirror image beam attain back to said splitter device;

said splitter device then redirects said mirror image beam to a second lens device which directs said mirror image beam to a filter assembly, thereby creating a filtered beam which is then directed to a filter exit aperture and into a detector which is communicatingly connected to said means for controlling: thus a plurality of beam paths are created and used simultaneously yet non-interferingly by and in said spectral instrument.

13. The spectrometer system according to claim 8 wherein said spectral instrument further comprises:

a plurality of optical components, each of which is oriented and located such that some optical components function to direct and define a plurality of beam paths for at least one optical beam of energy which enters said spectral instrument, and other optical components function to alter the nature said optical beam wherein said beam paths are used concurrently and simultaneously and in a non-interfering manner by said optical beam traveling over said beam paths; and wherein said optical components comprise at least one optical device that modifies said at least one optical beam, creating a modified optical beam, and directs said modified optical beam on a first beam path to a splitter device having a first entrance slit through which said modified optical beam passes resulting in an entrance slit beam;

said entrance slit beam is passed onto a prism device then onto a crating from which said entrance slit beam is diffracted, thereby becoming a reflected beam;

said reflected beam is passed back to said prism device which then passes said reflected beam to a lens device and then to a first exit slit through which said reflected beam passes to an optical chopper device; said optical chopper device chops said reflected beam into a chopped beam and directs said chopped beam to a mirror device which creates a mirror image beam and passes said mirror image beam on a second beam path through a second input slit and back to said lens device;

said lens device directs said mirror image beam hack to said prism device and then back to said grating which then directs said mirror image beam again back to said prism device and to a second exit slit which directs said mirror image beam again back to said splitter device;

said splitter device then redirects said mirror image beam to a second lens device which directs said mirror image beam to a filter assembly, thereby creating a filtered beam which is then directed to a tilter exit aperture and into a detector which is communicatingly connected to said means for controlling; thus a plurality of beam paths are created and used simultaneously yet non-interferingly by and in said spectral instrument.

14. The spectrometer system according to claim 9 wherein said spectral instrument further comprises:

a plurality of optical components, each of which is oriented and located such that some optical components function to direct and define a plurality of beam paths for at least one optical beam of energy which enters said spectral instrument, and other optical components function to alter the nature of said optical beam wherein said beam paths are used concurrently and simultaneously and in a non-interfering manner by said optical beam traveling over said beam paths; and wherein said optical components comprise at least one optical device that modifies said at least one optical beam, creating a modified optical beam, and directs said modified optical beam on a first beam path to a splitter device having a first entrance slit through which said modified optical beam passes resulting in an entrance slit beam;

said entrance slit beam is passed onto a prism device then onto a grating from which said entrance slit beam is diffracted, thereby becoming a reflected beam;

said reflected beam is passed back to said prism device which then passes said reflected beam to a lens device and then to a first exit slit through which said reflected beam passes to an optical chopper device;

said optical chopper device chops said reflected beam into a chopped beam and directs said chopped beam to a mirror device which creates a mirror image beam and passes said mirror image beam on a second beam path through a second input slit and back to said lens device;

said lens device directs said mirror image beam back to said prism device and then back to said crating which then directs said mirror image beam again back to said prism device and to a second exit slit which directs said mirror image beam again back to said splitter device;

said splitter device then redirects said mirror image beam to a second lens device which directs said mirror image beam to a filter assembly, thereby creating a filtered beam which is then directed to a filter exit aperture and into a detector which is communicating connected to said means br controlling; thus a plurality of beam paths are created and used simultaneously yet non-interferingly by and in said spectral instrument.

15. A spectral instrument for performing analysis of spectral energy of an input optical beam, said input optical beam having a wavelength distribution and an energy distribution, said spectral instrument comprising:

a first monochromator portion comprising a first entrance slit said first entrance slit in optical beam path relationship with a grating component, a first exit slit in diffracted and wavelength selected beam path relationship with a first reflective surface of said grating component; and a second monochromator portion comprising a second entrance slit, said second entrance slit being in a mirror image optical beam path relationship with a return mirror and with said to grating component, a second exit slit in twice diffracted and twice wavelength selected beam path relationship with a second reflective surface of said grating component, said optical beam paths of said first, monochromator portion and said second monochromator portion being substantially non-interfering.

16. The spectral instrument for performing analysis of spectral energy of an input optical beam according to claim 15 further comprising means for chopping at a predetermined chop rate, any optical beam within both said first monochromator portion and said second monochromator portion, said means for chopping positioned in optical beam path relationship with said first exit slit and said return mirror and said return mirror and said second entrance slit of said second monochromator portion.

17. The spectral instrument for performing analysis of spectral energy of an input optical beam according to claim 15 further comprising means for moving said grating component thereby selecting the wavelength discriminated by both said first monochromator and said second monochromator.

18. The spectral instrument for performing analysis of spectral energy of an input optical beam according to claim 16 further comprising means for moving said grating component thereby selecting the wavelength discriminated in both said first monochromator and said second monochromator.

19. A spectral instrument for performing analysis of spectral energy of an input optical beam, said input optical beam having a wavelength distribution and an energy distribution, said spectral instrument comprising:

a first entrance slit upon which an entrance optical beam, derived from said input optical beam, is directed in a first path, said first entrance slit creating thereby a first entrance slit beam, said first entrance slit beam having a cross section dimensions substantially equal to the cross section dimensions of said first entrance slit;

a first location on a prism first reflecting surface upon which said entrance slit beam is directed in a second path, said prism first reflecting surface directs said entrance slit beam on a third path to a grating component, said entrance slit beam thereby being diffracted by said grating component creating a first diffracted beam which first diffracted beam is reflected in a fourth path from said grating component surface to a first location on a prism second reflecting surface;

field lens upon which said first diffracted beam is directed on a fifth path from said prism second reflecting surface focuses and directs said first diffracted beam and a defined and selected portion of the optical spectrum of said first diffracted beam onto a first exit slit, said first exit slit thereby discriminating and producing a narrow bandwidth beam of optical wavelengths;

return mirror upon which said narrow bandwidth beam is directed on a sixth path, said return mirror creating a mirror image beam of said narrow bandwidth beam and directing on a seventh path said mirror image beam to said field lens;

second entrance slit upon which said mirror image beam is directed on an eighth path by said field lens providing discrimination of said mirror image beam;

a second location of said prism second reflecting surface upon which said discriminated mirror image beam is directed, said prism second reflecting surface directs on a ninth path, said discriminated mirror image beam to said grating component, said discriminated mirror image beam being diffracted by said grating component creating a diffracted discriminated mirror image beam which diffracted discriminated mirror image beam is reflected on a tenth path from said grating component surface to a second location on said prism first reflecting surface; and a second exit slit upon which said second location on said prism first reflecting surface directs on an eleventh path, said diffracted discriminated mirror image beam providing a second discrimination of said diffracted mirror image beam.

20. The spectral instrument for performing analysis of spectral energy of an input optical beam according to claim 19 farther comprising means for chopping at a predetermined chop rate said first diffracted beam and said mirror image beam.

21. The spectral instrument for performing analysis of spectral energy of an input optical beam according to claim 19 further comprising means for moving said grating component thereby selecting the wavelength discriminated by both said first exit slit and said second exit slit.

22. The spectral instrument for performing analysis of spectral energy of an input optical beam according to claim 20 further comprising means for moving said grating component thereby selecting the wavelength discriminated by both said first exit slit and said second exit slit.

23. The spectral instrument for performing analysis of spectral energy of an input optical beam according to claim 19 further comprising:

a turning mirror directing therefrom, said diffracted discriminated mirror image beam into an instrument output portion; and input optics, said input optics selected from the group consisting of a wide-angle lens, a narrow-angle lens and fiber optics.

24. The spectral instrument for performing analysis of spectral energy of an input optical beam according to claim 20 further comprising a turning mirror directing therefrom, said diffracted discriminated mirror image beam into an instrument output portion; and input optics, said input optics selected from the group consisting of a wide-eyed lens, a narrow-eyed lens and fiber optics.

25. The spectral instrument for performing analysis of spectral energy of an input optical beam according to claim 22 further comprising a turning mirror directing therefrom, said diffracted discriminated mirror image beam into an instrument output portion; and input optics, said input optics selected from the group consisting of a wide-eyed lens, a narrow-eyed lens and fiber optics.

26. The spectral instrument for performing analysis of spectral energy of an input optical beam according to claim 23 further comprising:
- a detector positioned in said instrument output portion upon which detector said diffracted discriminated mirror image beam is directed;
- a detector amplifier for amplifying said detected information; and
- means for communicating said amplified detected information to a user of said spectral instrument.

27. The spectral instrument for performing analysis of spectral energy of an input optical beam according to claim 24 further comprising:
- a detector positioned in said instrument output portion upon which detector said diffracted discriminated mirror image beam is directed;
- a detector amplifier for amplifying said detected information; and
- means for communicating said amplified detected information to a user of said spectral instrument.

28. The spectral instrument for performing analysis of spectral energy of an input optical beam according to claim 25 further comprising:
- a detector positioned in said instrument output portion upon which detector said diffracted discriminated mirror image beam is directed;
- a detector amplifier for amplifying said detected information; and
- means for communicating said amplified detected information to a user of said spectral instrument.

29. The spectral instrument for performing analysis of spectral energy of an input optical beam according to claim 27 wherein said detector amplifier is a lock-in amplifier.

30. The spectral instrument for performing analysis of spectral energy of an input optical beam according to claim 21 further comprising means for optical initialization and a means for verification of wavelength using a known wavelength source directed, on-axis, to said grating component and detected by an initialization detector.

31. The spectral instrument for performing analysis of spectral energy of an input optical beam according to claim 22 further comprising means for optical initialization and a means for verification of wavelength using a known wavelength source directed, on-axis, to said grating component and detected by an initialization detector.

32. The spectral instrument for performing analysis of spectral energy of an input optical beam according to claim 25 further comprising means for optical initialization and a means for verification of wavelength using a known wavelength source directed, on-axis, to said grating component and detected by an initialization detector.

33. The spectral instrument for performing analysis of spectral energy of an input optical beam according to claim 28 further comprising means for optical initialization and a means for verification of wavelength using a known wavelength source directed, on-axis, to said grating component and detected by an initialization detector.

34. The spectral instrument for performing analysis of spectral energy of an input optical beam according to claim 21 wherein said means for moving said grating component comprises:
- a stepping motor having a motor shaft output end; and
- a means for automatic caging of said grating during shipping comprising
- a fixed anti-backlash magnet having a fixed magnet first opposing side and a fixed magnet second opposing side and a fixed magnet shaft recess, said fixed magnet first opposing side affixed to said motor shaft output end;
- a slip-coupled anti-backlash magnet having two opposing sides, a slip magnet first opposing side and a slip magnet second opposing side, and a slip magnet shaft recess, said slip magnet first opposing side facing said fixed magnet second opposing side;
- a flexible torsion drive shaft having a proximal end and a distal end, said proximal end disposed within said fixed magnet shall recess and said slip magnet shaft recess; and
- a worm drive at said distal end of said flexible torsion drive shaft, said worm drive engaged with gears such that rotation of said worm drive causes an arcuate movement of said grating.

35. The spectral instrument for performing analysis of spectral energy of an input optical beam according to claim 22 wherein said means for moving said grating component comprises:
- a stepping motor having a motor shaft output end; and
- a means for automatic caging of said grating during shipping comprising
- a fixed anti-backlash magnet having a fixed magnet first opposing side and a fixed magnet second opposing side and a fixed magnet shaft recess, said fixed magnet first opposing side affixed to said motor shaft output end;
- a slip-coupled anti-backlash magnet having two opposing sides, a slip magnet first opposing side and a slip magnet second opposing side, and a slip magnet shaft recess, said slip magnet first opposing side facing said fixed magnet second opposing side;
- a flexible torsion drive shaft having a proximal end and a distal end, said proximal end disposed within said fixed magnet shaft recess and said slip magnet shaft recess; and
- a worm drive at said distal end of said flexible torsion drive shaft, said worm drive engaged with gears such that rotation of said worm drive causes an arcuate movement of said grating.

36. The spectral instrument for performing analysis of spectral energy of an input optical beam according to claim 25 wherein said means for moving said grating component comprises:
- a stepping motor having a motor shaft output end; and
- a means for automatic caging of said grating during shipping comprising
- a fixed anti-backlash magnet having a fixed magnet first opposing side and a fixed magnet second opposing side and a fixed magnet shaft recess, said fixed magnet first opposing side affixed to said motor shaft output end;
- a slip-coupled anti-backlash magnet having two opposing sides, a slip magnet first opposing side and a slip magnet second opposing side, and a slip magnet shaft recess, said slip magnet first opposing side facing said fixed magnet second opposing side;
- a flexible torsion drive shaft having a proximal end and a distal end, said proximal end disposed within said fixed magnet shaft recess and said slip magnet shaft recess; and
- a worm drive at said distal end of said flexible torsion drive shaft, said worm drive engaged with gears such that rotation of said worm drive causes an arcuate movement of said grating.

37. The spectral instrument for performing analysis of spectral energy of an input optical beam according to claim 28 wherein said means for moving said grating component comprises:

a stepping motor having a motor shaft output end; and a means for automatic caging of said grating during shipping comprising a fixed anti-backlash magnet having a fixed magnet first opposing side and a fixed magnet second opposing side and a fixed magnet shaft recess, said fixed magnet first opposing side affixed to said motor shall output end;

a slip-coupled anti-backlash magnet having two opposing sides, a slip magnet first opposing side and a slip magnet second opposing side, and a slip magnet shaft recess, said slip magnet first opposing side facing said fixed magnet second opposing side;

a flexible torsion drive shaft having a proximal end and a distal end, said proximal end disposed within said fixed magnet shaft recess and said slip magnet shaft recess; and a worm drive at said distal end of said flexible torsion drive shaft, said worm drive engaged with gears such that rotation of said worm drive causes an arcuate movement of said grating.

38. The spectral instrument for performing analysis of spectral energy of an input optical beam according to claim 31 wherein said means for moving said grating component comprises:

a stepping motor having a motor shaft output end; and a means for automatic caging of said grating during shipping comprising a fixed anti-backlash magnet having a fixed magnet first opposing side and a fixed magnet second opposing side and a fixed magnet shaft recess, said fixed magnet first opposing side affixed to said motor shaft output end;

a slip-coupled anti-backlash magnet having two opposing sides, a slip magnet first opposing side and a slip magnet second opposing side, and a slip magnet shaft recess, said slip magnet first opposing side facing said fixed magnet second opposing side;

a flexible torsion drive shaft having a proximal end and a distal end, said proximal end disposed within said fixed magnet shaft recess and said slip magnet shaft recess; and a worm drive at said distal end of said flexible torsion drive shaft, said worm drive engaged with gears such that rotation of said worm drive causes an arcuate movement of said grating.

39. The spectral instrument for performing analysis of spectral energy of an input optical beam according to claim 32 wherein said means for moving said grating component comprises:

a stepping motor having a motor shaft output end; and a means for automatic caging of said crating snipping comprising a fixed anti-backlash magnet having a fixed magnet first opposing side a fixed magnet second opposing side and a fixed magnet shaft recess, said fixed magnet first opposing side affixed to said motor shaft output end;

a slip-coupled anti-backlash magnet having two opposing sides, a slip magnet first opposing side and a slip magnet second opposing side, and a slip magnet shaft recess, said slip magnet first opposing side facing said fixed magnet second opposing side;

a flexible torsion drive shaft having a proximal end and a distal end, said proximal end disposed within said fixed magnet shaft recess and said slip magnet shaft recess; and a worm drive at said distal end of said flexible torsion drive shaft, said worm drive engaged with gears such that rotation of said worm drive causes an arcuate movement of said grating.

40. A method for using a spectral system for measuring and transmitting spectral energy data in the form of a spectrum derived from wavelength data characteristic of a stream of electromagnetic radiation, said spectral system being controlled by a plurality of commands, said spectral system having; at least one function, a plurality at calibration operations, automatic caging capability, manual filter control, and a shutter, said method comprising:

powering up said spectral system; initializing said spectral system; calibrating said spectral system;

commanding said spectral system to perform functions comprising; reading said spectral energy data, scanning said spectral energy data, integrating said spectral energy data over time, displaying said spectral energy data, requesting status of said spectral system stopping an ongoing command, performing automatic caging of means for causing said scanning, reading temperature, calibrating said spectral system, opening shutter, closing shutter, controlling a selection of order sorting lifters, and entering sleep mode;

receiving from said spectral system, said spectral energy data read by said spectral system;

interpreting said received data: and powering down said system.

* * * * *